United States Patent
Naitoh

(10) Patent No.: US 8,564,797 B2
(45) Date of Patent: Oct. 22, 2013

(54) SETTING CHANGING DEVICE, METHOD AND PROGRAM STORAGE MEDIUM

(75) Inventor: Koichi Naitoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 707 days.

(21) Appl. No.: 12/784,003

(22) Filed: May 20, 2010

(65) Prior Publication Data

US 2011/0102830 A1  May 5, 2011

(30) Foreign Application Priority Data

Oct. 30, 2009  (JP) .................................. 2009-250952

(51) Int. Cl.
*G06F 3/12* (2006.01)
*G06K 15/00* (2006.01)

(52) U.S. Cl.
USPC ....... 358/1.13; 358/1.14; 358/1.15; 358/1.16; 726/21; 726/28; 717/169

(58) Field of Classification Search
USPC ..................... 358/1.13–1.16, 1.9; 726/21, 28; 717/169
See application file for complete search history.

(56) References Cited

U.S. PATENT DOCUMENTS

| | | | |
|---|---|---|---|
| 6,614,550 B1 | 9/2003 | Minagawa | |
| 7,600,107 B2 * | 10/2009 | Kato | ................. 713/1 |
| 7,872,771 B2 * | 1/2011 | Kojima et al. | ................ 358/1.15 |
| 8,259,315 B2 * | 9/2012 | Ebuchi | ........................ 358/1.13 |
| 8,427,683 B2 * | 4/2013 | Mitsui | ........................ 358/1.15 |
| 2004/0090649 A1 | 5/2004 | Minagawa | |
| 2006/0072140 A1 * | 4/2006 | Mitani | ........................ 358/1.13 |
| 2006/0170947 A1 * | 8/2006 | Kurabayashi | ................ 358/1.13 |
| 2006/0221372 A1 * | 10/2006 | Onishi et al. | ................. 358/1.13 |
| 2006/0224876 A1 * | 10/2006 | Kato | ................................... 713/1 |
| 2006/0268306 A1 * | 11/2006 | Kojima et al. | ................ 358/1.13 |
| 2007/0041039 A1 * | 2/2007 | Doui | ........................... 358/1.15 |
| 2008/0304092 A1 * | 12/2008 | Ebuchi | ........................ 358/1.13 |
| 2009/0193365 A1 * | 7/2009 | Sugiura | ........................ 715/840 |

FOREIGN PATENT DOCUMENTS

JP  A-2000-122790  4/2000
JP  A-2008-227884  9/2008

* cited by examiner

*Primary Examiner* — Twyler Haskins
*Assistant Examiner* — Dennis Dicker
(74) *Attorney, Agent, or Firm* — Oliff & Berridge, PLC

(57) ABSTRACT

A setting changing device includes a display controller, a receiver, and a changing section. The display controller displays a designation screen for at least one of a first designation that designates a first item and an initial value of the first item; a second designation that designates a second item that prohibits changing via the setting screen by a user; or a third designation that designates a third item that prohibits displaying on the setting screen for users. The changing section, on the basis of the at least one of the first designation, second designation and third designation, (a) changes respective settings of the target device drivers, or, (b) generates for each of changeable setting items of the target device drivers, setting data that is referenced by device drivers when the setting screen is displayed.

20 Claims, 12 Drawing Sheets

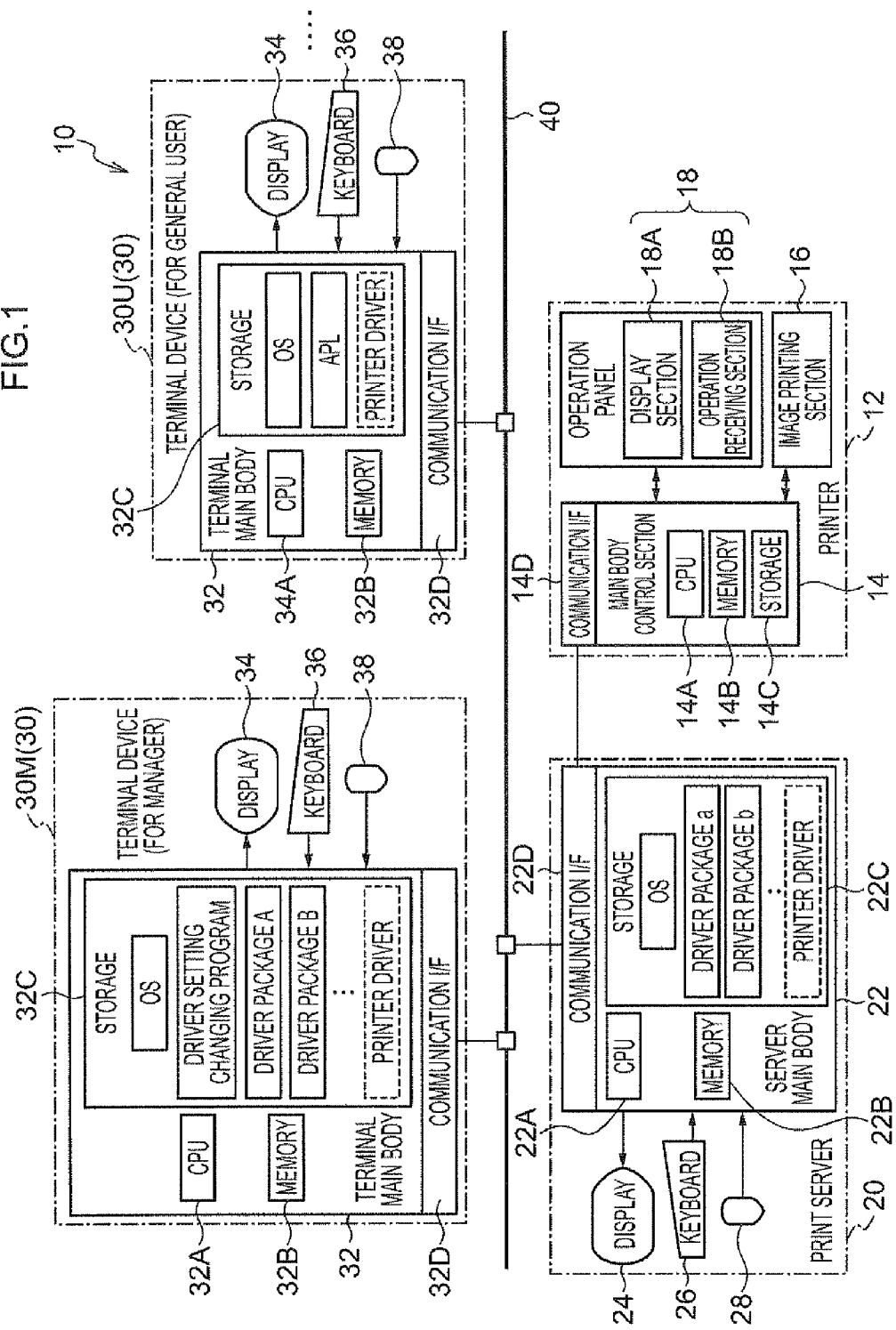

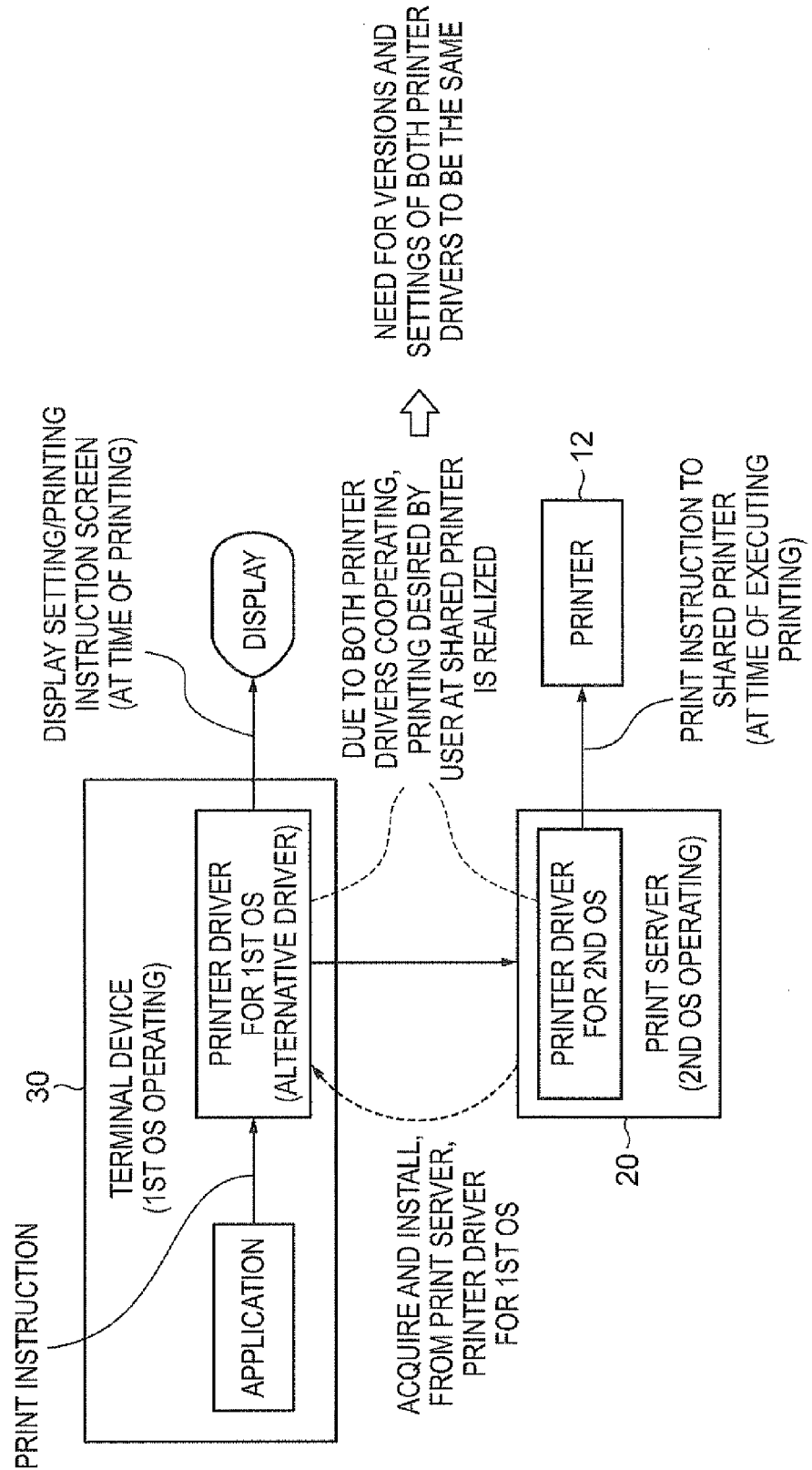

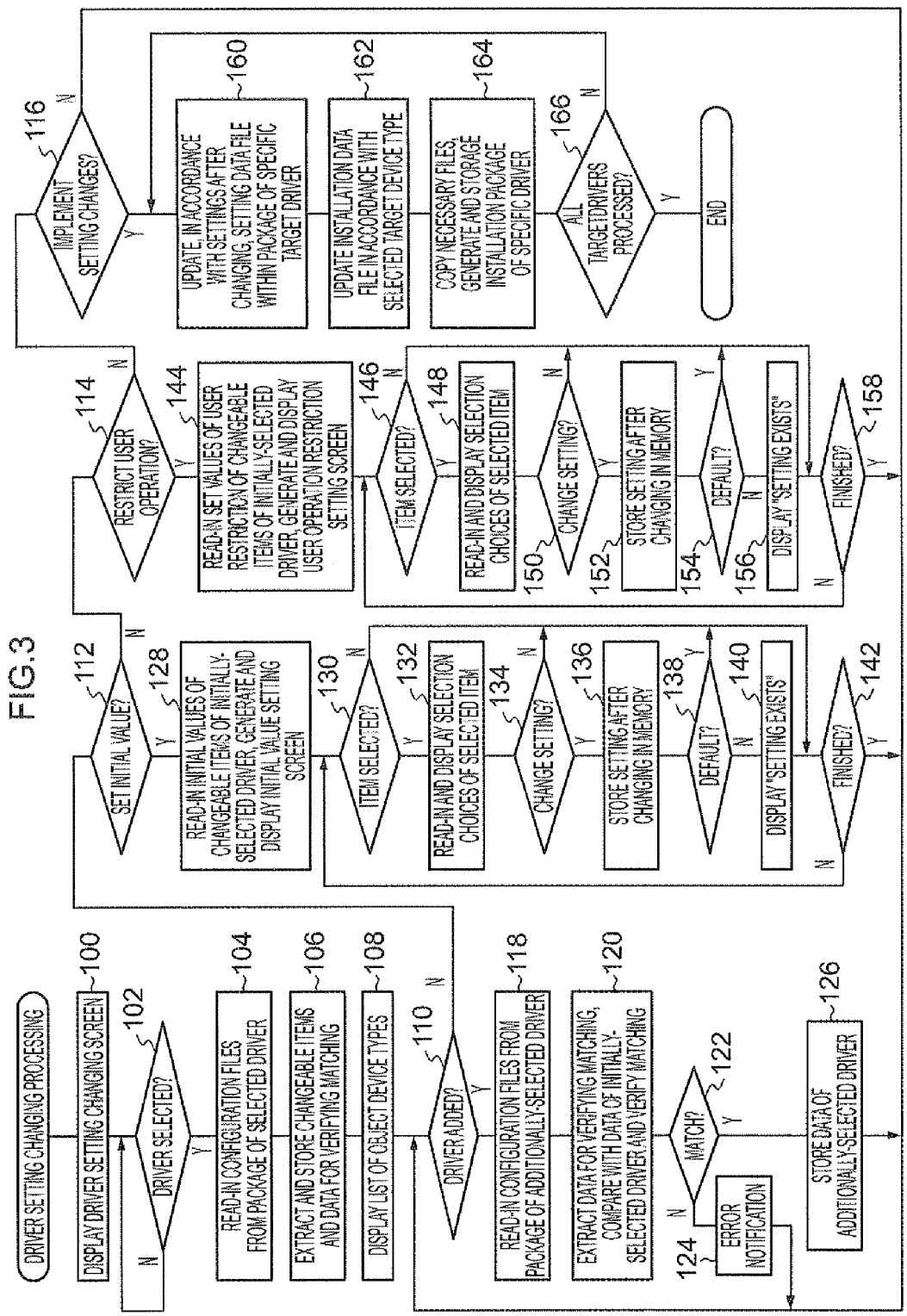

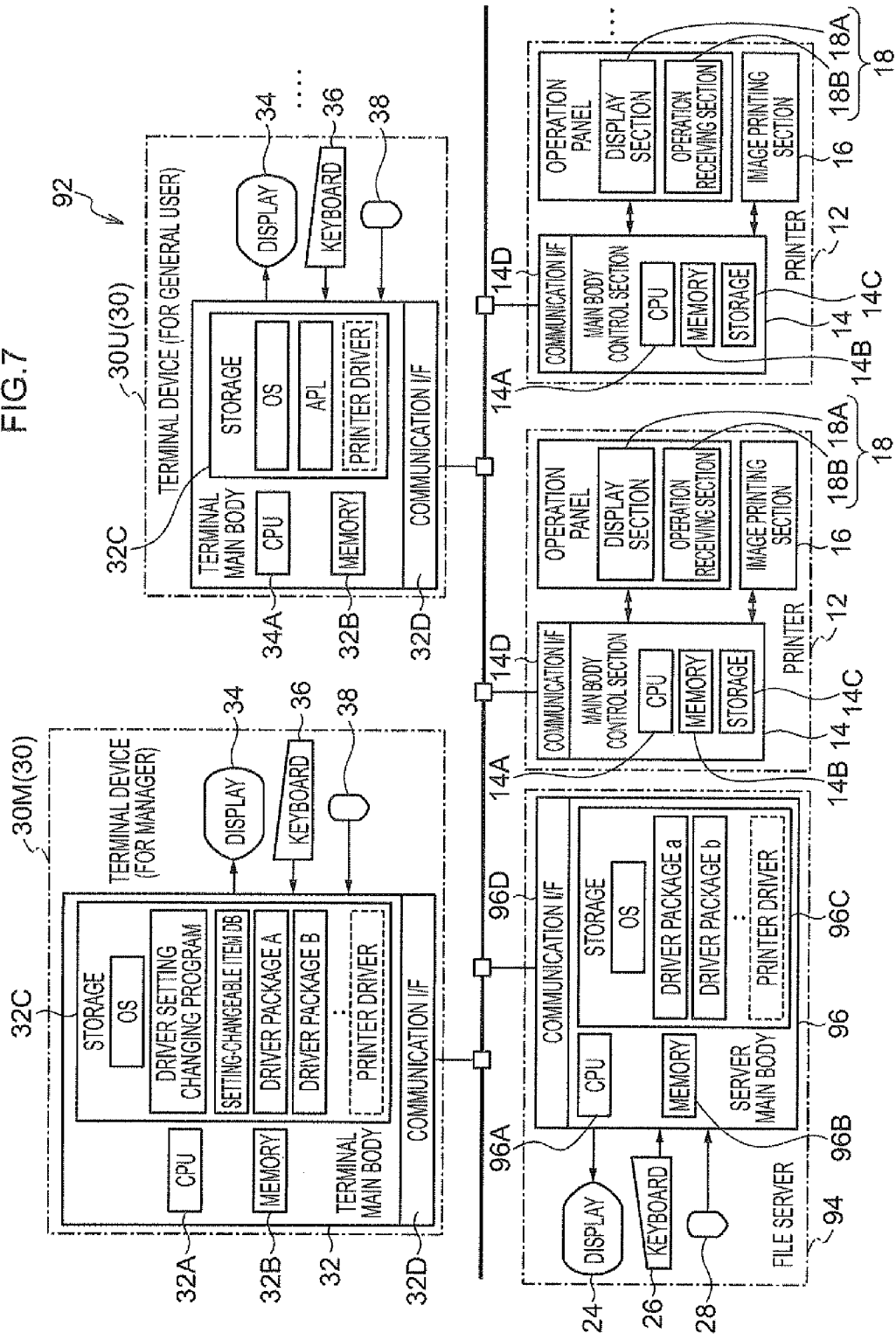

SETTING CHANGING DEVICE, METHOD AND PROGRAM STORAGE MEDIUM

CROSS-REFERENCE TO RELATED APPLICATION

This application is based on and claims priority under 35 USC 119 from Japanese Patent Application No. 2009-250952 filed on Oct. 30, 2009.

BACKGROUND

1. Technical Field

The present invention relates to a setting changing device, a setting changing program storage medium, and a setting changing method.

2. Related Art

Conventionally, techniques for setting print settings (configurations) and for changing setting data of a device have been proposed.

SUMMARY

As aspect of the present invention is a setting changing device having: a display controlling section that displays a designation screen for carrying out, with respect to at least one device driver among a plurality of target device drivers, at least one of a first designation that designates, from among changeable items that can be changed via a setting screen that is displayed by the at least one target device driver, a first item that is an object of initial value changing and an initial value of the first item; a second designation that designates, from among the changeable items, a second item that prohibits changing via the setting screen by a user other than a manager; or a third designation that designates, from among the changeable items, a third item that prohibits displaying on the setting screen for users other than a manager; a receiving section that receives the at least one of the first designation, the second designation or the third designation; and a changing section that, on the basis of the at least one of the received first designation, second designation and third designation, (a) changes respective settings of the plurality of target device drivers, or, (b) for each of the plurality of target device drivers, generates or changes for each of the changeable items, setting data that is referenced by device drivers when the setting screen is displayed, and that prescribes an initial value of the changeable item and at least one of existence of prohibiting of changing of the changeable item via the setting screen or existence of display of the changeable item on the setting screen.

BRIEF DESCRIPTION OF THE DRAWINGS

Exemplary embodiments of the present invention will be described in detail based on the following figures, wherein:

FIG. 1 is a schematic block diagram showing a computer system relating to a first exemplary embodiment;

FIG. 2 is a schematic drawing for explaining a print instruction to a shared printer when the operating OSs of a terminal device and a print server are different;

FIG. 3 is a flowchart showing the contents of driver setting changing processing relating to the first exemplary embodiment;

FIG. 7 is a schematic block diagram showing a computer system relating to a third exemplary embodiment;

DETAILED DESCRIPTION

Figure 4A:
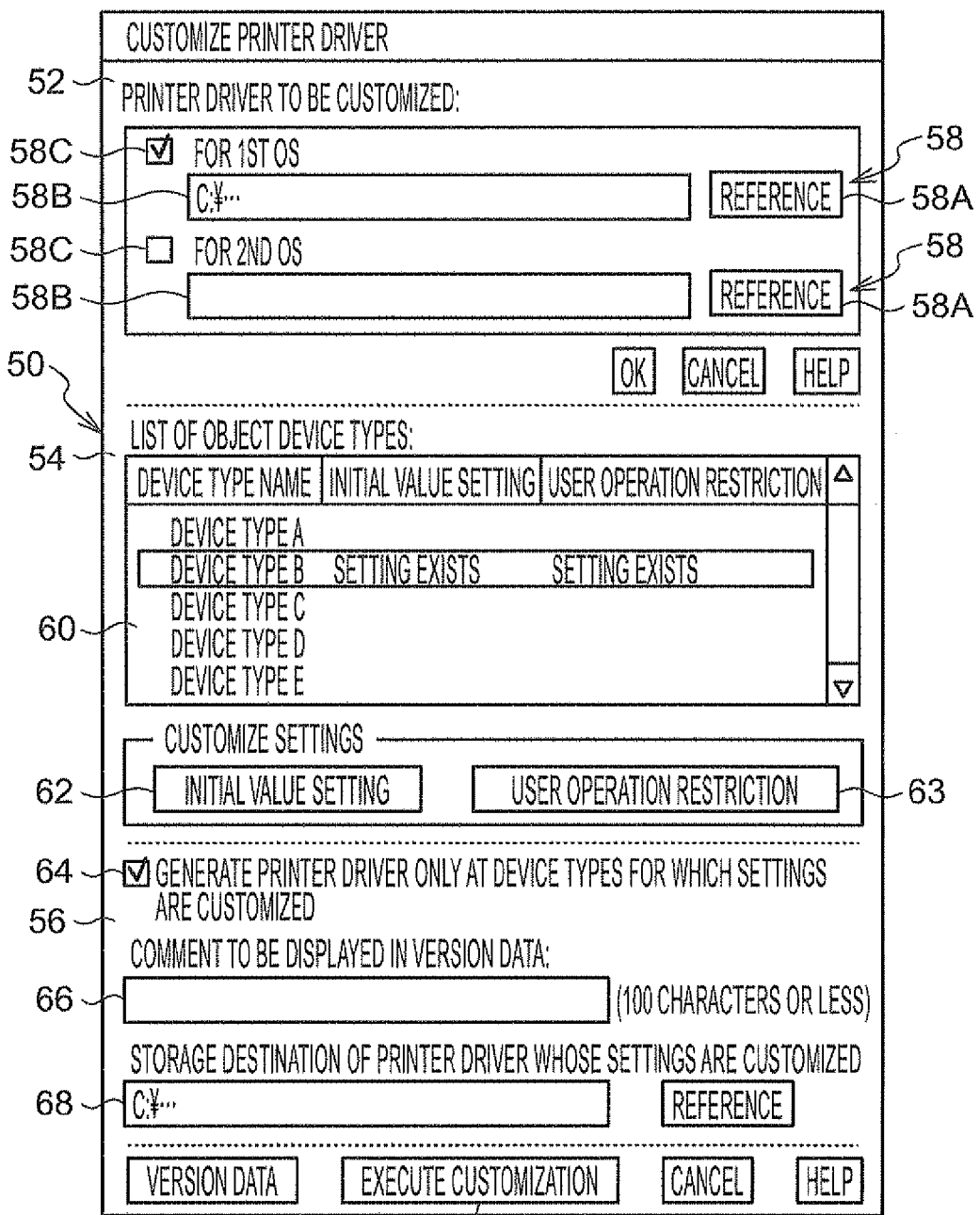
FIG. 4A is an image drawing showing an example of a driver setting changing screen relating to the first exemplary embodiment.

Exemplary embodiments of the present invention are described in detail hereinafter with reference to the drawings.

[First Exemplary Embodiment]

A computer system 10 relating to the first exemplary embodiment is shown in FIG. 1. The computer system 10 includes a print server 20 to which a printer 12 is connected, and plural terminal devices 30, being connected to one another via a communication line 40.

The printer 12 has a main body control section 14 that incorporates a CPU 14A formed from a microcomputer or the like, a memory 14B, a non-volatile storage 14C formed from an HDD (Hard Disk Drive) or a flash memory or the like, and a communication I/F (interface) section 14D. The printer 12 is connected to the print server 20 via the communication I/F section 14D. An image printing section 16, that prints on a recording sheet an image that is expressed by inputted print image data, and an operation panel 18 provided with a display section 18A formed from an LCD or the like and an operation section 18B formed from a ten key or a touch panel or the like, are respectively connected to the main body control section 14.

The image printing section 16 may be configured, for example, so as to form an image by an electrophotographic method on the basis of print image data, and transfer and fix the formed image onto a recording sheet. Alternately, the image printing section 16 may be structured so as to cause ink drops to be ejected from plural nozzles by an inkjet system based on print image data, and record an image on a recording sheet. The image printing section 16 may use any of various types of known systems as the system for recording an image onto a recording sheet.

The print server 20 has a server main body 22 that incorporates therein a CPU 22A, a memory 22B, a non-volatile storage 22C formed from an HDD, a flash memory or the like, and a communication I/F section 22D. The print server 20 is connected to the communication line 40 via the communication I/F section 22D, and the printer 12 also is connected to the communication I/F section 22D. A display 24, a keyboard 26 and a mouse 28 are respectively connected to the server main body 22. The print server 20 is a server that provides the service of enabling the plural terminal devices 30 that are connected to the communication line 40 to respectively instruct the printer 12 to print documents (the service of causing the printer 12 to function as a shared printer). The program of an operating system (OS), and the program of a printer driver for carrying out processing that causes printing to be executed at the printer 12 instead of the terminal device 30, are respectively installed in the storage 22C of the server main body 22. Packages of plural types of printer drivers (installation packages, shown as "driver package a" and "driver package b" in FIG. 1) are also stored in the storage 22C.

When the terminal device 30 is to carry out the processing of instructing the print server 20 to print by the printer 12, the installation package of the printer driver is downloaded from the print server 20 to the terminal device 30, and is used in installing the program of the printer driver in the terminal device 30. In the present exemplary embodiment, the installation package of the printer driver is generated through a driver setting changing processing that will be described later. In the stage before the driver setting changing processing is carried out, the storage 22C of the print server 20 does not store the installation package of the printer driver, and is in a state in which the program of the printer driver also is not yet installed.

On the other hand, the terminal device 30 has a terminal main body 32 that is formed from a personal computer (PC) and in which a CPU 32A, a memory 32B, a non-volatile storage 32C formed from an HDD, a flash memory or the like, and a communication I/F section 32D are incorporated. The terminal main body 32 is connected to the communication line 40 via the communication I/F section 32D. A display 34, a keyboard 36 and a mouse 38 are respectively connected to the terminal main body 32 of the terminal device 30.

In the present exemplary embodiment, among the plural terminal devices 30 that are provided in the computer system 10, there are the terminal devices 30 (30U) that general users operate, and the terminal device 30 (30M) that the manager of the computer system 10 operates. Note that the reference characters "M" and "U" are appended only when it is necessary to be discriminate for whom the terminal device 30 is provided. The program of an OS, an application program (shown as "APL" in FIG. 1) for creating a document to be printed and instructing printing, and the program of a printer driver are respectively installed in the storages 32C of the terminal devices 30U. The program of the printer driver is installed by using an installation package of the printer driver that is downloaded to the terminal device 30U from the print server 20. In the stage before driver setting changing processing that will be described hereinafter is carried out, the program of the printer driver is not yet installed.

The program of an OS, the driver setting changing program, and the program of a printer driver are respectively installed in the storage 32C of the terminal device 30M. Packages of printer drivers, that are furnished from the manufacturer of the printer 12 (furnished packages: shown as "driver package A" and "driver package B" in FIG. 1) are also stored in the storage 32C. The driver setting changing program is a program for carrying out driver setting changing processing, that will be described hereinafter, at the terminal device 30M. Due to the driver setting changing program being executed by the CPU 32A, the terminal device 30M functions as an example of a setting changing device.

In the stage before the driver setting changing processing that is described hereinafter is carried out, the program of the printer driver is not yet installed. Further, the furnished packages, that are stored in the storage 32C of the terminal device 30M, also are packages that are essentially for installing programs of printer drivers. However, in the present exemplary embodiment, when the driver setting changing processing that is described hereinafter is carried out, installation of a printer driver is carried out without using the above-described packages, and by using an installation package that is generated through the driver setting changing processing and is stored in the storage 22C of the print server 20.

Operation of the first exemplary embodiment is described next. Generally, when a user who is operating a terminal device instructs printing by a printer, the printer driver that is installed in the terminal device is activated. Due to a setting/printing instruction screen being displayed on the display of the terminal device by the printer driver that is activated, printing that uses the various types of functions that the printer has can be instructed via the displayed setting/printing instruction screen. However, in a computer system in which printing by a printer can be instructed from plural terminal devices such as the computer system 10 relating to the first exemplary embodiment, for reasons in light of management and system operation for example, for some of the functions among the various types of functions that the printer has, there are cases in which the need arises to recommend or force a specific setting or to prevent the use of some functions with respect to print instructions to the printer from the individual terminal devices.

The recommending of specific settings for some functions among the various types of functions can be realized by, for the specific items corresponding to these some functions among the respective items (e.g., paper size, number of copies to be outputted, and the like) that can be changed via the setting/printing instruction screen (changeable items), setting values, that correspond to the specific settings, in advance as the initial values thereof. The forcing of specific settings for some functions among the various types of functions can be realized by, for the specific items corresponding to these some functions among the respective changeable items, setting values, that correspond to the specific settings, in advance as the initial values thereof, and further, carrying out setting such that changing of the settings by the user is prohibited (such that user operation is restricted). The prohibiting of use of some functions among the various types of functions can be realized by, for the specific items corresponding to these some functions among the respective changeable items, setting values expressing that the some functions cannot be used as the initial values thereof, and further, carrying out setting such that the changing of the settings by the user is prohibited (user operation is restricted) or such that the some functions are excluded from objects of display on the setting/printing instruction screen (prohibiting display on the setting/printing instruction screen). However, in order to apply the above-described recommending or forcing of specific settings and prohibiting of use of some functions uniformly to plural terminal devices, the printer drivers that are installed in the individual terminal devices must be set to uniform settings that are different than standard settings (default settings).

In the computer system 10 relating to the first exemplary embodiment, the print server 20 provides the service of causing the printer 12 to function as a shared printer. A user, who is operating the terminal device 30, causing the printer 12 (the shared printer) to carry out the desired printing is realized by the printer driver that is installed in the terminal device 30 and the printer driver that is installed in the print server 20 carrying out processing in cooperation with one another. For example, as shown in FIG. 2, the printer driver that is installed in the terminal device 30 carries out processings such as the displaying of the setting/printing instruction screen on the display 34 of the terminal device 30, the transmitting to the print server 20 of the data of the document that is to be printed and the data expressing the printing conditions that the user has designated, and the like. The printer driver that is installed in the print server 20 carries out processings such as transferring data to the printer 12, controlling the printing that is carried out at the printer 12, and the like. Therefore, in a structure that causes printing to be carried out at the printer 12 from the terminal device 30 through the print server 20, in order to apply the above-described recommending or forcing of specific settings and prohibiting of use of some functions, the settings of the printer driver installed in the terminal device 30 and the printer driver installed in the print server 20 as well must be set to uniform settings that are different than the standard settings.

However, there are cases in which the OS that is operating on the terminal device 30 (first OS in FIG. 2) is different than the OS that is operating on the print server 20 (second OS in FIG. 2). Depending on the combination of the first OS and the second OS, there is the need to install different device drivers for the OS in the terminal device 30 and the print server 20. For example, if the combination of the first OS and the second OS is 32-bit Windows® XP and 32-bit Windows® Vista manufactured by Microsoft Corporation, it suffices for the device drivers installed in the terminal device 30 and the print server 20 to be the same. However, if, for example, the combination of the first OS and the second OS is 32-bit Windows® XP and 64-bit Windows® Vista manufactured by Microsoft Corporation, a device driver for 64-bit Windows® Vista must be installed in the print server 20, whereas a device driver (called an alternative driver) for 32-bit Windows® XP must be installed in the terminal device 30. (Note that, in the present specification, OSs that require installation of different device drivers are called "different OSs" hereinafter.) Further, in order to apply the above-described recommending or forcing of specific settings and prohibiting of use of some functions in an environment in which different device drivers are installed in the terminal device 30 and the print server 20, versions of the printer driver installed in the terminal device 30 and the printer driver installed in the print server 20, i.e., different printer drivers for the OS, must be provided, and the settings as well must be set to uniform settings that are different than standard settings.

Conventionally, changing of the standard settings with respect to plural types of printer drivers at which a program module cannot be used in common, such as printer drivers whose corresponding OSs are different, must be carried out individually for each of the individual printer drivers, and there is the possibility that non-matching of settings will arise due to setting error. If non-matching arises between the settings of the printer driver installed in the terminal device 30 and the setting of the printer driver installed in the print server 20, there is the possibility that the aforementioned recommending or forcing of specific settings and prohibiting of use of some functions may not function as the manager intended.

Thus, in the first exemplary embodiment, the driver setting changing program is installed in the storage 32C of the terminal device 30M. When it is desired to recommend or force specific settings for some of the functions among the various types of functions that the printer 12 has with respect to print instructions to the printer 12 from the individual terminal devices 30 for reasons in light of management or in light of system operation, the manager, before installing the printer drivers in the individual terminal devices 30 and the print server 20, may cause the driver setting changing program to be executed by the CPU 32C of the terminal device 30M and the driver setting changing processing shown in FIG. 3 to be carried out, in a state in which furnished packages, that contain the printer drivers that are to be installed in the individual terminal devices 30 and the print server 20, are stored in the storage 32C of the terminal device 30M.

Hereinafter, as an example, a case will be described in which, because the OSs that are operating at the terminal devices 30 and the print server 20 are different, batch changing of the settings is carried out with respect to the printer driver installed in the terminal devices 30 and the printer driver installed in the print server 20 (printer drivers whose corresponding OSs are different). However, batch changing of settings are realized by a similar processing even if, for example, some of the plural terminal devices 30 provided at the computer system 10 have a different operating OS than the other terminal devices 30 (e.g., if there exist, among the plural terminal devices 30, both terminal devices 30 whose operating OS is Windows® and terminal devices 30 whose operating OS is Mac OS®).

In the driver setting changing processing relating to the first exemplary embodiment, first, in step 100, a driver setting changing screen 50, that is shown as an example in FIG. 4A, is displayed on the display 34 of the terminal device 30M. In next step 102, it is judged whether or not a (furnished package that contains a) target printer driver that is the object of setting changing has been selected via the driver setting changing screen 50 displayed in step 100. The driver setting changing screen 50 shown in FIG. 4A is a screen that batch changing of the settings of printer drivers whose corresponding OSs are different also can be carried out, and includes a furnished package selection area 52, a device type selection area 54, and an attribute data setting area 56.

Generally, printer drivers whose corresponding OSs are different are included in different furnished packages, even if the device type of the corresponding printer 12 is the same. Therefore, the furnished package selection area 52 is provided in order to designate and select the plural furnished packages that contain the printer drivers whose corresponding OSs are different. Plural unit selection areas 58 are provided in the furnished package selection area 52 in correspondence with the plural types of printer drivers whose corresponding OSs are different. The unit selection area 58 is formed from a button 58A that is for instructing starting of designation of the storage destination of the furnished package in which the printer driver is contained, a display box 58B in which the directory of the designated storage destination is displayed when the storage destination of the furnished package is designated through a storage destination designation screen that is displayed by the button 58A being selected, and a select box 58C that is for selecting whether or not the (printer driver contained in the) furnished package whose directory is displayed in the display box 58B is to be an object of setting change.

Printer drivers of plural similar types of printers 12 whose corresponding OSs are the same (e.g., plural types of printers 12 whose specifications are about the same and at which only the existence of minute functions or the processing speed is different; at plural similar types of printers 12, generally, the setting-changeable items of the printer drivers are the same or are substantially common) may be contained respectively in a single package of the furnished package of the printer drivers. Therefore, the device type selection area 54 is provided in order to make the manager designate/select a target device type that is the object of setting changing among the plural device types of the printers 12 corresponding to the plural types of printer drivers, that are contained in the selected single furnished package as the object of setting changing (target furnished package). Provided in the device type selection area 54 are a device type display box 60 in which the device types of the printers 12 are displayed in a list, a button 62 for designating changing of the initial values of any of setting-changeable items with respect to the printer driver that corresponds to the device type selected in the device type display box 60, and a button 63 for designating whether or not changing of setting by operation of the user is to be restricted, for any of setting-changeable items of the printer driver corresponding to the selected device type.

Provided in the attribute data setting area 56 are: a selection box 64 that is for selecting whether or not printer driver setting changing (the changing of initial values of changeable items or the changing of settings as to whether or not to restrict changing by user operation), that is carried out by selecting the specific device type of the printer 12, is to be applied also to the printer drivers corresponding to the other devices types of the printer 12 that are contained in the same furnished package; an input box 66 for inputting comments to be displayed together with version data, when the version data of the printer driver after the setting change is displayed; and a designation box 68 for designating the storage destination of the (installation package that contains the) printer driver after the setting change. A button 70, for instructing execution of the setting changes with respect to the printer driver, is also provided beneath the attribute data setting area 56.

When the driver setting change screen 50, that has the above-described screen structure, is displayed on the display 34 of the terminal device 30M, the manager may first select the button 58A within the furnished package selection area 52, via the keyboard 36 and the mouse 38 of the terminal device 30M. Next, through a storage destination designation screen that is displayed accompanying the selection of the button 58A, the manager may designate the storage destination of the furnished package that contains a target printer driver that is the object of setting change (the printer driver installed in the terminal device 30 or the print server 20). Accompanying this, the directory of the designated storage destination is displayed in the display box 58B. The manager may select, as the target furnished package, the (printer driver contained in the) furnished package whose storage destination was designated through the corresponding selection box 58C.

Figure 5A:
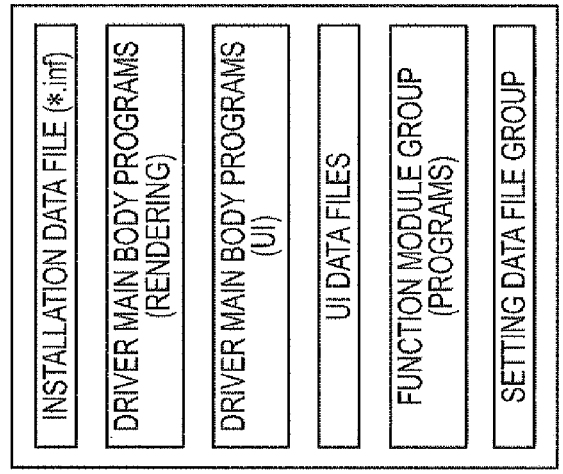
FIGS. 5A through 5C are schematic drawings respectively showing examples of driver packages.

When the above-described operations are carried out by the manager, the judgment in step 102 is affirmative, and the routine moves on to step 104 where configuration files are read-out from the furnished package of the printer driver that was selected as the target furnished package. As shown in FIG. 5A as an example, the furnished package of a printer driver is structured from files including an installation data file, driver main programs, UI data files, a function module group, and a setting data file group. The installation data file is formed from data such as files that are objects of installation of the printer driver, and the like. The driver main programs include programs that carry out processings such as rendering, processings relating to the user interface such as the display of the setting/printing instruction screen, and the like. The UI data files contain data that defines the user interfaces realized by these programs (e.g., data expressing the screen contents of the setting/printing instruction screen, data that defines prohibiting processing such as, when the user selects a given function, excluding other related functions from the selection choices, and, when the user respectively selects a first function and a second function that cannot be selected simultaneously, displaying an error message or the like). The function module group realizes various types of functions other than the driver body programs (e.g., the function of acquiring data from the printer 12, and the like). The setting data file group includes various types of setting data for the printer driver. In step 104, the data files (the installation data file, the UI data files and the setting data file group) among these configuration files are read-out from the storage 32C to the memory 32B.

In a furnished package that includes respective printer drivers of printers 12 of plural, similar device types, the installation data file corresponds to all of the printer drivers that are contained in the furnished package (one file is used in installing the respective plural types of printer drivers). However, with regard to the driver main programs, the UI data files, the function module group and the setting data file group, some of the files or modules thereof correspond to plural printer drivers, but there are also files and modules that correspond only to a single printer driver.

In next step 106, data that expresses the changeable items of the printer driver, data that can be used in verifying the matching of plural types of printer drivers, and attribute data such as data expressing the storage destination and the like, are extracted from the configuration files that were read-out in step 104, and the extracted data are stored in the memory 32B. In the furnished package shown in FIG. 5A, based on the premise that setting changing is carried out, changeable item data and initial value/operation restriction data are added to the setting data file group. Selection choices of names and initial values, selection choices of settings relating to user operation restriction, and data for displaying the individual changeable items in a tree structure and divided per type in the same way as the setting/printing instruction screen (e.g., data such as the display positions in the tree structure) are respectively included in the changeable item data for each of the individual changeable items whose setting can be changed by user. Initial values and setting values relating to user operation restriction are respectively set in the initial value/operation restriction data for each of the individual changeable items of the printer drivers that are defined in the changeable item data.

The above-described changeable item data and initial value/operation restriction data conventionally are data that are dispersed within the setting data file group. However, in order to simplify the driver setting changing processing, in the furnished package shown in FIG. 5A, these data are gathered as setting changeable item data and initial value/operation restriction data. The driver setting changing processing relating to the first exemplary embodiment is premised on a furnished package, in which the aforementioned data are gathered as changeable item data and initial value/operation restriction data, being selected/designated as the target furnished package. Therefore, the extracting of the data that expresses the changeable items of the printer driver in step 106 can be realized by extracting the changeable item data from the setting data file group of the configuration files read-out in step 104.

For example, data identifying the device type (model) of the printer 12 that the printer driver corresponds to and version data of the printer driver can be used as the data for verifying the matching of plural types of printer drivers. These data are set in a file that is set in advance within the setting data file group, or in the installation data file. The extracting of data for verifying the matching of plural types of printer drivers, in step 106 can be realized by extracting, from the aforementioned file, data that identifies the device type of the corresponding printer 12 (corresponding device type identifying data) and version data of the printer driver. The data for verifying the matching of plural types of printer drivers is not limited to the aforementioned corresponding device type identifying data and version data, and other data such as, for example, changeable item data or the like can be used.

In step 108, on the basis of the corresponding device type identifying data extracted in step 106, the names of all of the device types (all of the models) of the printers 12, that the printer driver contained in the selected target furnished package corresponds to, are displayed in a list within the device type display box 60 of the device type selection area 54. When the names are displayed in the list, due to the manager operating the keyboard 36 and the mouse 38 of the terminal device 30M, operations are carried out of selecting a target device type (e.g., the device type of the printer 12 provided at the computer system 10) from among the displayed device types, and selecting the selection box 64 within the attribute data setting area 56 as needed.

In next step 110, it is judged whether or not a target printer driver (i.e., a new target furnished packaged that contains the target printer driver) has been added. If the judgment is negative, the routine moves on to step 112, and it is judged whether or not changing of the initial values of the changeable items of the printer driver has been instructed due to the button 62 within the device type selection area 54 being selected. If this judgment also is negative, the routine moves on to step 114, and it is judged whether or not changing of the settings of the restrictions relating to user operation has been instructed for the changeable items of the printer driver due to the button 64 within the device type selection area 54 being selected. If this judgment as well is negative, the routine moves on to step 116, and it is judged whether or not execution of setting changing with respect to the printer driver has been instructed due to the button 70 provided beneath the attribute data setting area 56 being selected. If this judgment also is negative, the routine returns to step 110, and step 110 through step 116 are repeated until any of the judgments is affirmative.

If the operating OSs of the terminal device 30 and the print server 20 are different as described above, in order to carry out batch changing of the settings with respect to plural printer drivers whose corresponding OSs are different, the button 58A within the furnished package selection area 52 may be selected. The storage destination of the furnished package that contains a target printer driver (the printer driver that was not selected previously among the printer driver to be installed in the terminal device 30 and the printer driver to be installed in the print server 20) may be designated through the storage destination designation screen that is displayed accompanying the selection of the button 58A. The target printer driver contained in the furnished package whose storage destination was designated may be selected via the corresponding selection box 58C. This series of operations may be carried out again by the manager.

When the above-described series of operations is carried out again, the judgment in step 110 is affirmative, and the routine moves on to step 118 where the configuration files are read-out from the furnished package of the target printer driver that was additionally selected by the manager. In step 120, data for verifying the matching of the printer drivers is extracted from the configuration files that were read-out in step 118. By comparing the extracted data with the same type of data that was extracted from the configuration files of the furnished package of the target printer driver that was initially selected and that was stored in the memory 32B (the data that was extracted and stored in above step 106), it is verified whether or not the target printer driver that was additionally selected matches the target printer driver that was initially selected.

When, for example, device type identifying data of the printers 12 to which the printer drivers correspond and version data of the printer drivers are used as the data for verifying the matching of the printer drivers, the above-described verification processing can be realized by judging whether or not the device type identifying data and version data of the additionally selected target printer driver respectively match the device type identifying data and version data of the initially selected target printer driver. Further, Devmode data or registry data can be used as or can also be used as the data for verifying the matching of the printer drivers. If Devmode data or registry data is used, the above-described verification processing can be realized by judging whether or not the structures of the Devmode data or the registry data coincide.

In next step 122, it is judged whether or not, in the verification processing of step 120, the additionally selected target printer driver matches the initially selected target printer driver. If this judgment is negative, the additionally selected target printer driver does not match the initial target printer driver, and, it can be judged that this is not a suitable relationship for using one of the printer drivers as an alternative driver in printing that uses the printer 12 as a shared printer. Accordingly, if the judgment in step 122 is negative, the routine moves on to step 124, and an error message stating that "The additionally-selected printer driver is not suited for printing using the printer 12 as a shared printer" is displayed on the display 34 of the terminal device 30M, and the routine returns to step 110. In this case, on the basis of the displayed error message, the manager can recognize that the additionally selected target printer driver does not match the initially selected target printer driver.

If the judgment in step 122 is affirmative, the additionally selected target printer driver matches the initially selected target printer driver, and it can be judged that this is a suitable relationship for using one of the printer drivers as an alternative driver in the printing that uses the printer 12 as a shared printer. Therefore, when the judgment in step 122 is affirmative, the routine moves on to step 126, and attribute data, such as data expressing the storage destination of the additionally selected target printer driver is stored in the memory 32B, and thereafter, the routine returns to step 110.

When changing the initial values of any of changeable items of a target printer driver, the manager may select, from among the device types of the printers 12 that are displayed in the list within the device type display box 60 of the device type selection area 54 of the driver setting changing screen 50, the target device type of the printer 12, and thereafter, selects the button 62 within the device type selection area 54.

Figure 4B:
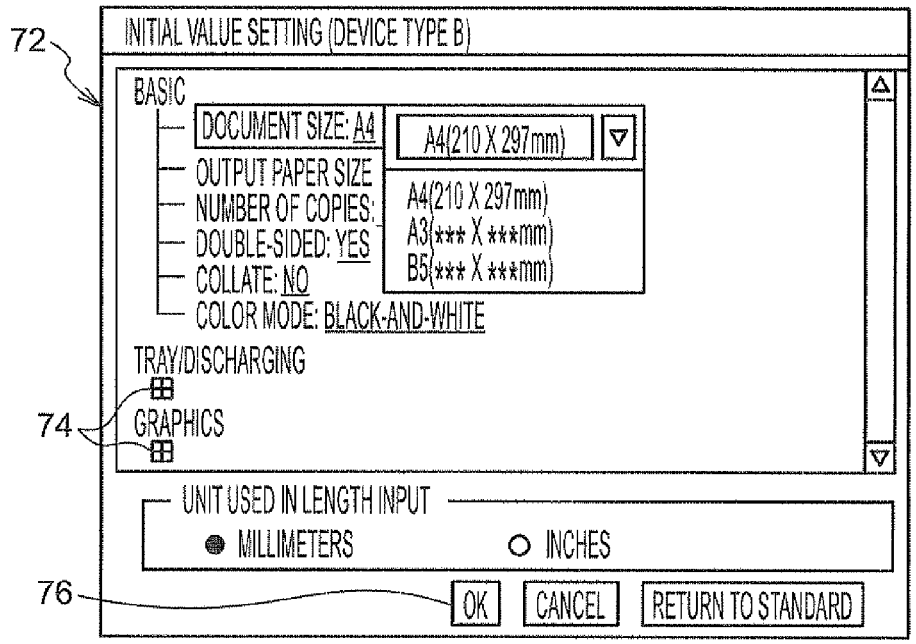
FIG. 4B is an image drawing showing an example of an initial value setting screen relating to the first exemplary embodiment.

Due thereto, the judgment in step 112 is affirmative, and the routine moves on to step 128 where changeable item data is extracted from the setting data file group that is included in the configuration files read-out in step 104 from the furnished package of the initially selected target printer driver. On the basis of the extracted changeable item data, as shown as an example in FIG. 4B, an initial value setting screen 72 is generated that displays, in a tree structure and divided into types, the names and the current initial values of the individual changeable items of the initially selected target printer driver, and the generated initial value setting screen 72 is displayed on the display 34 of the terminal device 30M. FIG. 4B shows an example in which the names and current initial values are displayed only for changeable items that are categorized as "basic" ("document size", "output paper size", "number of copies", and the like). However, for other categories such as "tray/ejecting" and "graphics" and the like as well, the names and current initial values of the corresponding changeable items can be expanded and displayed when the manager selects a mark 74 that shows that display is collapsed.

In next step 130, it is judged whether or not any of the changeable items displayed within the initial value setting screen 72 have been selected. If the judgment is negative, the routine moves on to step 142, and it is judged whether or not a button 76 provided within the initial value setting screen 72 has been selected in order to instruct ending of the initial value changing of the changeable items. If this judgment also is negative, the routine returns to step 130, and steps 130 and 142 are repeated until either of the judgments is affirmative.

When the initial value setting screen 72 shown in FIG. 4B is displayed on the display 34 of the terminal device 30M, the manager may select a target changeable item that is an object of initial value changing, among the changeable items that are displayed within the initial value setting screen 72. When this operation is carried out, the judgment in step 130 is affirmative, and the routine moves on to step 132 where the selection choices of the initial value that are set in advance for the changeable item selected by the manager, are extracted from the initial value/operation restriction data, and the extracted selection choices for the initial value are displayed in a list within the initial value setting screen 72. FIG. 4B shows, as an example, a state in which "document size" is selected as a target changeable item (the current initial value is "A4"), and "A4", "A3" and "B5" are displayed in a list as selection choices for the initial value of "document size". In next step 134, it is judged whether or not a change in the current initial value has been instructed for the target changeable item.

When the selection choices of the initial value of the target changeable item are displayed in the list within the initial value setting screen 72 as shown in FIG. 4B, the manager may select the desired selection choice among the selection choices. When this operation is carried out, it is judged that changing of an initial value has been instructed, and the judgment in step 134 is thereby affirmative. The routine moves on to step 136 where the initial value, that corresponds to the selection choice selected by the manager, is stored in the memory 32B as the initial value after changing for the target changeable item. If none of the selection choices are selected by the manager, the judgment in step 134 is negative, and the routine moves on to step 142.

In next step 138, it is judged whether or not the initial value after changing is the default initial value that is set in advance for the target changeable item. If this judgment is negative, the routine moves on to step 140 where "setting exists" of the initial value is displayed in the display box of the device type that is currently selected, in the device type display box 60, and the routine moves on to step 142. If the initial value after changing is the default initial value, the judgment in step 138 is negative, and the routine skips step 140 and moves on to step 142.

For all of the changeable items for which the manager desires to change the initial value, the manager may select the changeable item and selecting the desired selection choice (the initial value after changing) from among the selection choices that are displayed in the list, as described above. By repeating step 130 through step 142 each time these operations are carried out, initial values after changing are respectively stored in the memory 32B for all of the target changeable items. Then, when the manager carries out the above-described respective operations for all of the target changeable items, the manager may select the button 76 within the initial value setting screen 72. The judgment in step 142 is thereby affirmative, and the routine returns to step 110.

When the setting relating to user operation restriction is to be changed for any of the changeable items of the target printer driver, the manager may select the target device type of the printer 12 from among the device types of the printers 12 that are displayed in the list within the device type display box 60, and thereafter, carries out the operation of selecting the button 63 within the device type selection area 54.

Figure 4C:
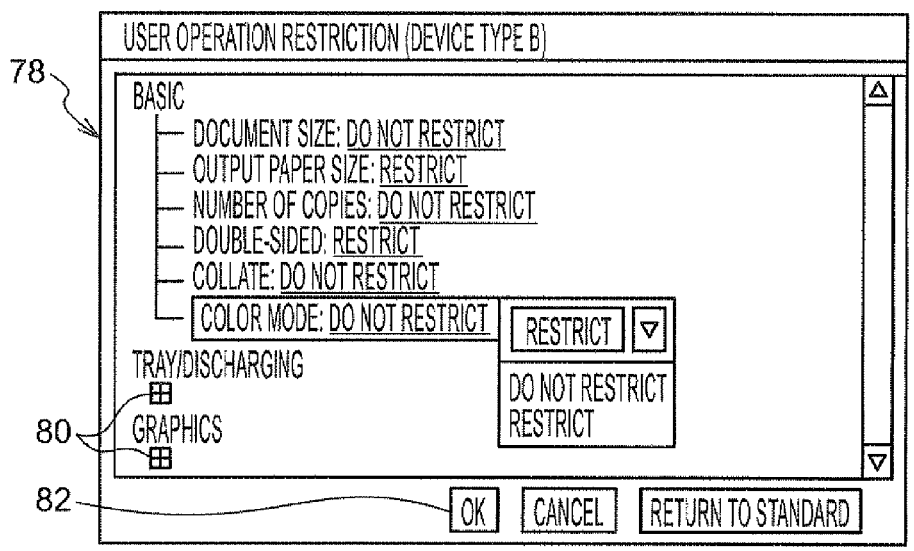
FIG. 4C is an image drawing showing an example of a user operation restriction setting screen relating to the first exemplary embodiment.

Due thereto, the judgment in step 114 is affirmative, and the routine moves on to step 144. As shown in FIG. 4C, a user operation restriction setting screen 78 that displays, in a tree structure and separated per category, the names of the individual changeable items and the current settings relating to user operation restriction of the initially selected target printer driver initially, is generated on the basis of the changeable item data that is included in the setting data file group among the configuration files of the initially selected target printer driver. The generated user operation restriction setting screen 78 is displayed on the display 34 of the terminal device 30M. FIG. 4C shows an example in which the names and the current settings relating to user operation restriction are displayed only for changeable items that are categorized as "basic" ("document size", "output paper size", "number of copies", and the like). However, for other categories such as "tray/ejecting" and "graphics" and the like as well, the names and current settings relating to user operation restriction of the corresponding changeable items are expanded and displayed when the manager selects a mark 80 that shows that display is collapsed.

In next step 146, it is judged whether any of the changeable items that are displayed within the user operation restriction setting screen 78 have been selected. If this judgment is negative, the routine moves on to step 158 where it is judged whether or not a button 82, that is provided within the user operation restriction setting screen 78 for instructing finishing of changing of the settings relating to user operation restriction, has been selected. If this judgment also is negative, the routine returns to step 146. Steps 146 and 158 are repeated until either of the judgments is affirmative.

When the user operation restriction setting screen 78 shown in FIG. 4C is displayed, the manager may select the changeable item whose setting relating to user operation restriction is to be changed (a target changeable item), from among the displayed changeable items. When this operation is carried out, the judgment in step 146 is affirmative, and the routine moves on to step 148 where the selection choices of the setting relating to user operation restriction that are set in advance for the selected changeable item, are extracted from the initial value/operation restriction data. The extracted selection choices of the setting relating to user operation restriction are displayed in a list within the user operation restriction setting screen 78. FIG. 4C shows, as an example, a state in which "color mode" is selected as a target changeable item (the current setting is "do not restrict"), and "restrict" and "do not restrict" are respectively displayed as the selection choices of the setting for "color mode". In next step 150, it is judged whether or not changing of the current setting has been instructed for the target changeable item.

When the selection choices of the setting relating to user operation restriction are displayed in the list for the changeable item as shown in FIG. 4C within the user operation restriction setting screen 78, the manager may select the desired selection choice among these selection choices. When this operation is carried out, it is judged that a change in setting relating to user operation restriction has been instructed, and the judgment in step 150 is thereby affirmative and the routine moves on to step 152. In step 152, the setting relating to user operation restriction, that corresponds to the selection choice selected by the manager, is stored in the memory 32B as a new setting. If none of the selection choices that are displayed in the list are selected by the manager, the judgment in step 150 is negative, and the routine moves on to step 158.

In next step 152, it is judged whether or not the setting after changing relating to user operation restriction is the default setting that is set in advance for that changeable item. If this judgment is negative, the routine moves on to step 156. In the present exemplary embodiment, because the default settings relating to user operation restriction for the individual changeable items are "do not restrict", "setting exists" in relation to the user operation restriction is displayed in the display box of the device type that is currently selected in the device type display box 60, and the routine moves on to step 156. If the setting after the changing is the default setting, the judgment in step 154 is negative, and the routine skips step 156 and moves on to step 158.

For all of the changeable items for which the manager desires to change the setting relating to user operation restriction, the manager may select a target changeable item and select the desired selection choice (the setting after changing) from among the selection choices that are displayed in a list, as described above. By repeating step 146 through step 158 each time these operations are carried out, the settings after changing are respectively stored in the memory 32B for all of the target changeable items. When the manager carries out the above-described respective operations for all of the target changeable items, the manager may select a button 82 within the user operation restriction setting screen 78. The judgment in step 158 is thereby affirmative, and the routine returns to step 110.

When the manager in this way changes the respective initial values of all of the target changeable items for initial value changing and changes the respective settings relating to user operation restriction for all of the target changeable items relating to user operation restriction, the manager may select the selection box 64 as needed, and thereafter, may select the button 70 within the driver setting changing screen 50. When these operations are carried out by the manager, the judgment in step 116 is affirmative. The routine moves on to step 160 where the setting data file group, that was read-out from furnished package of the initially selected target printer driver and that is stored in the memory 32B, is updated in accordance with the settings after changing that are stored in the memory 32B.

Concretely, when the processings of step 128 through step 142 are carried out in accordance with instructions from the manager, the initial values that are set in the initial value/ operation restriction data that is included in the setting data file group are respectively changed to the initial values after changing that are stored in the memory 32B, for the changeable items for which a change in initial value was instructed by the manager among the target changeable items of the printer driver. When the processings of step 144 through step 158 are carried out in accordance with instructions from the manager, the settings relating to user operation restriction that are set in the initial value/operation restriction data that is included in the setting data file group are respectively changed to the settings after changing that are stored in the memory 32B, for the changeable items for which a change in setting relating to user operation restriction was instructed by the manager among the target changeable items of the printer driver.

In next step 162, on the basis of whether or not the selection box 64 is selected and which device type is selected as the target device type of the printers 12 displayed in a list in the device type display box 60, the device type that is the object of installation package generation is recognized among all of the device types of the printers 12 for which printer drivers are contained in the furnished package of the initially selected printer driver. Thereafter, the installation data file is updated in accordance with the recognized device type.

Concretely, when the selection box 64 is not selected, all of the device types of the printers 12 for which printer drivers are contained in the furnished package of the initially selected printer driver, are recognized as device types that are objects of installation package generation. If the selection box 64 is selected, among all of the device types of the printers 12 for which printer drivers are contained in the furnished package of the initially selected printer driver (i.e., all of the device types of the printers 12 that are displayed in the list in the device type display box 60), the target device type is recognized as the device type that is the object of installation package generation. Then, updating of the installation data file is carried out, such as, among the descriptions relating to the respective device types of the printers 12 in that file, descriptions relating to device types that are other than the object of installation package generation are deleted, and the names of files that are objects of installation are changed to names that differ per device type, and the like.

In next step 164, the program file group that is needed for installation of the printer driver of the device type that was just recognized (e.g., the driver main body programs, the UI data files, the function module group) is read-out by the memory 32B from the furnished package of the initially selected printer driver. A file group, in which the UI data files and the setting data file group that was updated in step 160 are added to the read-out program file group, is copied such that there is the same number thereof as the number of device types that are objects of installation package generation. Names that differ per device type (the names described in the installation data file) are given thereto, and the installation data file that was updated in step 162 is added thereto. The installation package of the printer driver is thereby generated. The generated installation package is stored in the storage 32C.

In next step 166, it is judged whether or not installation package generation has been carried out for all of the target printer drivers. If the processings of above-described step 118 through step 126 have been carried out due to the manager carrying out the operation of adding, as an target printer driver, a furnished package that contains a printer driver that is an object of setting changing, this judgment is negative, the routine returns to step 160, and step 160 through step 166 are repeated. Due thereto, the installation package generation is respectively carried out for the furnished packages of all of the target printer drivers. When the judgment in step 166 is affirmative, the driver setting changing processing ends.

In the above-described driver setting changing processings, steps 100, 128, 144 may correspond to the functions of a display controlling section, and step 130 through step 142, step 144 through step 158, and step 160 through step 166 may correspond to the functions of a changing section, and steps 120, 122 may correspond to the functions of a judging section.

When the generation of installation packages ends, the manager may upload the generated installation packages to the print server 20 from the terminal device 30M. Due thereto, the uploaded installation packages are respectively stored in the storage 22C of the print server 20, as shown by "driver package a", "driver package b" as an example in FIG. 1. Thereamong, the installation package that corresponds to the OS that is operating on the print server 20 is used in installing the printer driver in the print server 20. On the other hand, the installation package that corresponds to the OS that is operating on the terminal device 30 is stored in the storage 22C of the print server 20 in a state in which it can be downloaded from the print server 20 to the terminal device 30. The installation package is downloaded to the terminal device 30 at an arbitrary timing (e.g., when causing printing to be carried out by the printer 12), and is used in installing the printer driver in the terminal device 30.

The installation packages used for installation of a printer driver into the print server 20 and the installation packages that are used for installation of a printer driver into the terminal device 30 are different. However, in the installation of a printer driver to either the print server 20 or the terminal device 30, the initial values/operation restriction data that are included in the individual installation packages are referenced, and the initial values that are set in the initial value/operation restriction data are set as the initial values of the individual changeable items. Further, the set values that are set in the initial value/operation restriction data are set as the settings relating to user operation restriction of the individual changeable items. Due thereto, also when the printer 12 is instructed by a user who is operating the terminal device 30U and the setting/printing instruction screen is displayed on the display 34 of the terminal device 30U by the printer driver installed therein, the initial values after changing are displayed for the changeable items for which changing of the initial values was instructed by the manager. Moreover, for the changeable items for which changing of the setting relating to user operation restriction was instructed by the manager, user operation is prohibited or permitted in accordance with the settings after changing.

Due to the above-described driver setting changing processing, the contents of the initial value/operation restriction data that are included in the individual installation packages (the initial values of the changeable items and the settings relating to user operation restriction) are set to the same. Further, in steps 120, 122 of the driver setting changing processing, it is confirmed that the printer driver to be installed in the print server 20 and the printer driver to be installed in the terminal device 30 match. Therefore, when the printer 12 functions as a shared printer, the recommending of a specific setting by the changing of the initial value of a changeable item, and the forcing of a specific setting by the changing of the setting relating to user operation restriction, function as the manager intended.

[Second Exemplary Embodiment]

A second exemplary embodiment of the present invention is described next. Because the second exemplary embodiment has the same structure as the first exemplary embodiment, the same reference numerals are given to the respective portions, and description of the structures is omitted. Hereinafter, the operation of the present second exemplary embodiment is described.

There are cases in which, in order to be able to use the printer 12 even in plural countries or geographical regions that use different languages, plural types of printer drivers, that have different notation languages in the setting/printing instruction screen and the like that are displayed on the display 34 or the like of the terminal device 30 (i.e., whose corresponding languages are different), are readied. In the same way as printer drivers whose corresponding OSs are different and that were described in the first exemplary embodiment, printer drivers whose corresponding languages are different also generally are contained in different furnished packages, even if the device types of the corresponding printers 12 are the same. When the computer system 10 is utilized by users who use different languages (e.g., if the computer system 10 is an intranet that spans across plural countries or geographical regions that use different languages, or the like), the need arises to set, to uniform settings that differ from the standard settings, settings for recommending or forcing a specific setting or settings for prohibiting use of some functions, for the plural printer drivers that have different corresponding languages.

Figure 6A:
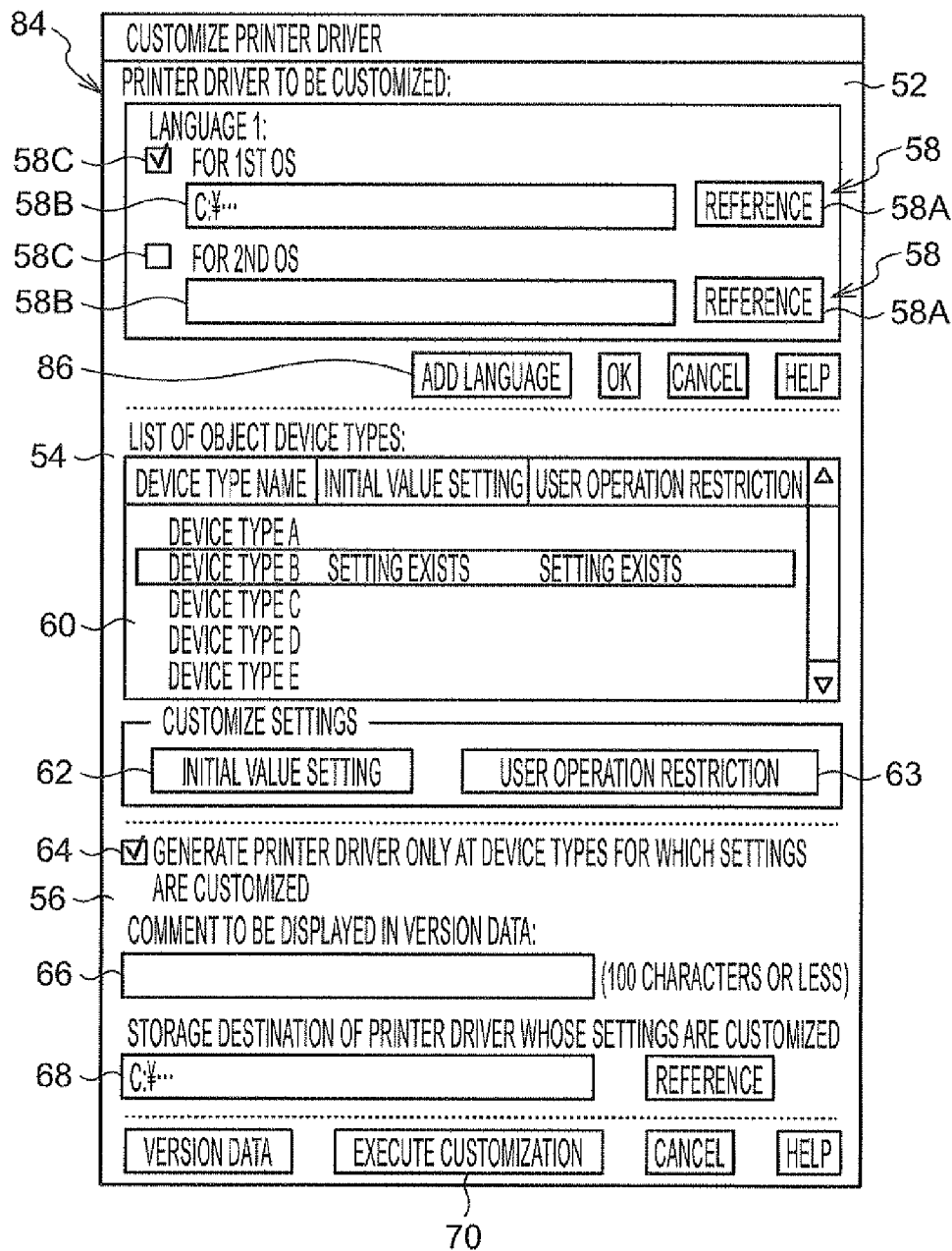
FIGS. 6A through 6C are image drawings showing driver setting changing screens relating to a second exemplary embodiment.

Therefore, in the driver setting changing processing relating to the second exemplary embodiment, in step 100, a driver setting changing screen 84 that is shown in FIG. 6A is displayed on the display 34 of the terminal device 30M instead of the driver setting changing screen 50 (see FIG. 4A) that was described in the first exemplary embodiment. The driver setting changing screen 84 shown in FIG. 6A is configured such that, in addition to batch changing of settings for printer drivers whose corresponding OSs are different, batch changing of settings for printer drivers whose device types of the corresponding printers 12 are the same and whose corresponding languages are different, also can be carried out. The driver setting changing screen 84 differs from the driver setting changing screen 50 described in the first exemplary embodiment in that a button 86 for designating (a furnished package containing) a printer driver of a different corresponding language is added to the furnished package selection area 52.

Figure 6B:
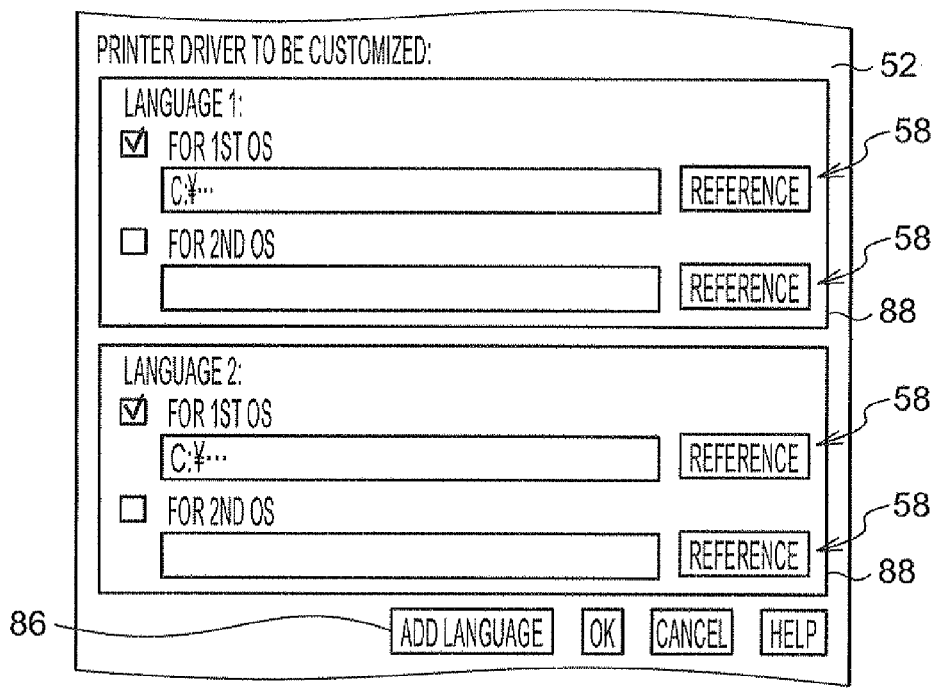

In the driver setting changing processing relating to the second exemplary embodiment, when the manager selects the button 86 in a state in which the driver setting changing screen 84 is displayed on the display 34 of the terminal device 30M, a new selection area 88 for an additional language, in which are provided plural unit selection areas 58 that are formed from the button 58A, the display box 58B and the select box 58C, is additionally displayed within the furnished package selection area 52 of the driver setting changing screen 84, as shown as an example in FIG. 6B.

With respect to the new selection area 88 that is newly displayed, the manager may first select the button 58A. Next, through the storage destination designation screen that is displayed accompanying the selection of the button 58A, the manager may designate the storage destination of the furnished package that contains the target printer driver of a different corresponding language that is the object of setting change, and select, as a target furnished package, the (printer driver contained in the) furnished package whose storage destination was designated through the corresponding select box 58C. By carrying out this series of operations, a printer driver of a different corresponding language can be added as a target printer driver. Also for the added target printer driver of a different corresponding language, an installation package, that includes initial value/operation restriction data in which the initial values of the individual changeable items and the settings relating to user operation restriction are made to be the same as those of other printer drivers, is generated in the same way as in the first exemplary embodiment.

When plural printer drivers whose corresponding languages are different are selected as the target printer drivers, there is the possibility that a language that the manager is not proficient in is included among the respective corresponding languages of the plural target printer drivers. However, the initial value setting screen 72 (see FIG. 4B) and the user operation restriction setting screen 78 (see FIG. 4C) are, as described in the first exemplary embodiment, generated and displayed on the basis of the changeable item data that is contained in the initially selected target furnished package. Therefore, the notation language in the initial value setting screen 72 and the user operation restriction setting screen 78 is made to coincide with the notation language in the setting/printing instruction screen and the like that are displayed by the printer driver that is contained in the initially selected target furnished package. Therefore, even if a language that the manager is not proficient in is included among the respective corresponding languages of the plural target printer drivers, a furnished package that contains a printer driver of a language in which the manager is proficient can be initially selected as a target furnished package. Due thereto, the manager can instruct changing of the initial values of the changeable items and changing of the settings relating to user operation restriction, through the initial value setting screen 72 and the user operation restriction setting screen 78 that are noted in a language in which the manager is proficient.

Cases can also be thought of in which a language in which the manager is proficient is not included among the respective corresponding languages of the plural target printer drivers. In such a case, for example, a furnished package that contains a printer driver, whose device type of the corresponding printer 12 is the same as those of the plural target printer drivers and that is of a language in which the manager is proficient, can be used as a dummy furnished package. After the manager first selects this dummy furnished package as a target furnish package, the manager may select, as a target furnished package, the furnished package that contains the actual target printer driver that is the essential object of setting changing. Due thereto, the manager can instruct changing of the initial values of the changeable items and changing of the settings relating to user operation restriction, through the initial value setting screen 72 and the user operation restricting screen 78 that are noted in a language in which the manager is proficient. In this case, it is good to make it such that an installation package that is generated from the dummy furnished package is not used in installing the printer driver into the terminal device 30, by excluding it from objects of uploading to the print server 20 from the terminal device 30M.

The above describes an example in which the notation language in initial value setting screen 72 and the user operation restriction setting screen 78 is made to match the notation language in the setting/printing instruction screen and the like that are displayed by the printer driver that is contained in the initially selected target furnished package. Instead, the notation language may be made to match the notation language in the setting/printing instruction screen and the like that are displayed by a printer driver that is contained in a furnished package that is designated separately by the manager from among the selected plural target furnished packages. The previously-described "initially selected target furnished package" and "furnished package that is designated separately by the manager" are examples of "a specific device driver that is selected in accordance with preset selection standards".

Figure 5B:
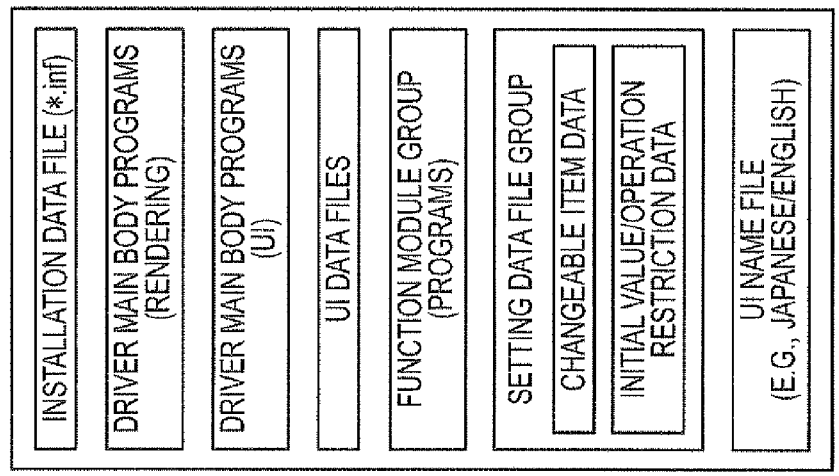
Figure 6C:
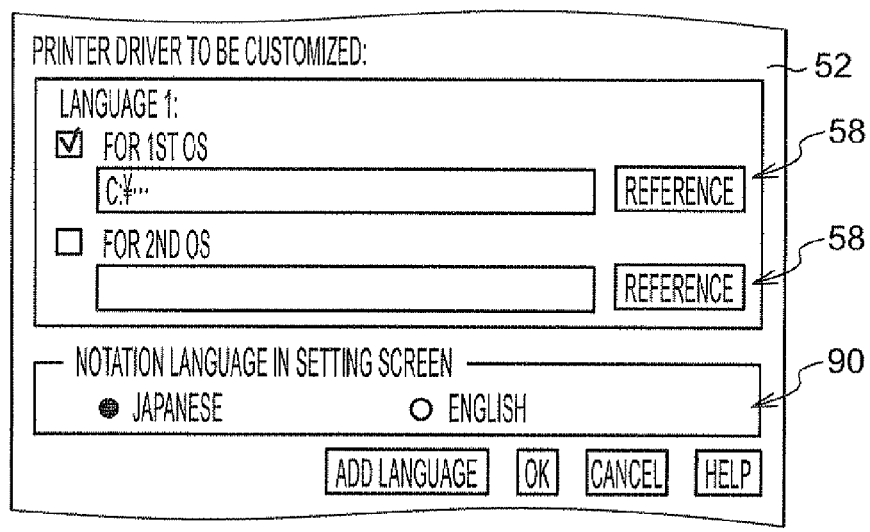

Further, instead of using a dummy furnished package as described above, a UI name file may be included in the furnished package as shown as an example in FIG. 5B. Character strings for noting the words that are displayed in the initial value setting screen 72 and the user operation restriction setting screen 78 (the driver setting changing screen 50, 84 may also be included) in any of plural languages (e.g., a language whose frequency of usage is high, or the like), are respectively set in the UI name file. In this case, as shown as an example in FIG. 6C, a select box 90 for selecting the notation language in the initial value setting screen 72 and the user operation restriction setting screen 78 and the like from among the plural languages that are set in the UI name file, is provided within the furnished package selection area 52. The manager may select the notation language via the select box 90, and when the initial value setting screen 72 or the user operation restriction setting screen 78 is displayed, the words within the displayed screen may be displayed by being replaced with character strings that correspond to the selected notation language and that are set in the UI name file. In this case as well, the manager can instruct changing of the initial values of the changeable items and changing of the settings relating to user operation restriction, that are noted in a language in which the manager is proficient. The UI name file is an example of word notation data.

[Third Exemplary Embodiment]

A third exemplary embodiment of the present invention is described next. Note that the same reference numerals are given to portions that are the same as in the first exemplary embodiment and the second exemplary embodiment, and description thereof is omitted. A computer system 92 relating to the third exemplary embodiment is shown in FIG. 7. The computer system 92 differs from the computer system 10 described in the first exemplary embodiment with regard to the point that plural printers 12 of different device types are provided, and the printers 12 are respectively directly connected to the communication line 40, and a file server 94 is provided instead of the print server 20. Print instructions corresponding to instructions from users are directly transmitted to the printers 12 from the terminal devices 30, without going through the print server 20 as in the first exemplary embodiment.

The file server 94 relating to the present third exemplary embodiment is the same as the print server 20 with regard to the points that the file server 94 has a server main body 96 that incorporates therein a CPU 96A, a memory 96B, a nonvolatile storage 96C formed from an HDD or a flash memory or the like, and a communication I/F section 96D, and that the file server 94 is connected to the communication line 40 via the communication I/F section 96D, and that an OS program and installation packages of plural types of printer drivers are stored in the storage 22C of the server main body 96. However, the printers 12 are not connected to the communication FE section 96D, and the file server 94 is not configured to provide the service of causing the printers 12 to function as shared printers for the terminal devices 30. The file server 94 differs from the print server 20 with regard to the point that the file server 94 provides only the service of distributing the installation packages of the printer drivers (the service of enabling downloading from the file server 94 to the terminal devices 30).

Figure 5C:
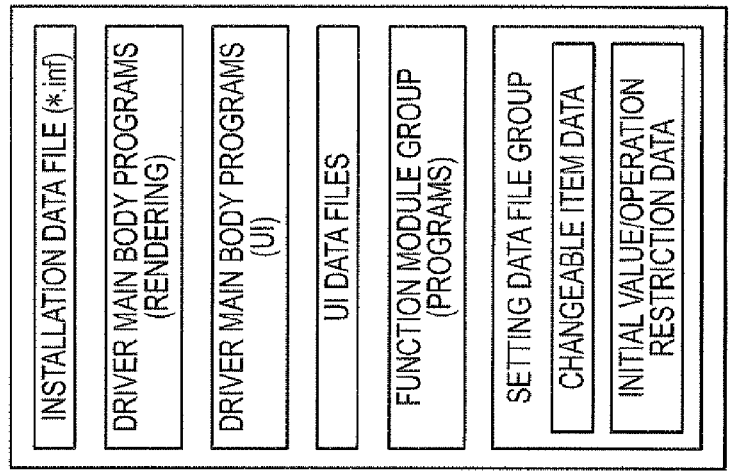

In the computer system 92 relating to the present third exemplary embodiment, a changeable item DB (database) is stored in the storage 32C of the terminal device 30M that the manager operates. The driver setting changing processing (FIG. 3) that was described in the first exemplary embodiment is premised on a furnished package, in which changeable item data and initial value/operation restriction data are added to the setting data file group as shown as an example in FIG. 5A, being designated as a target furnished package. However, a furnished package that accompanies the existing printer 12 is generally configured such that data such as the names and initial values of the changeable items of the printer driver, the settings relating to user operation restriction, and the like are set so as to be dispersed within the setting data file group, as shown in FIG. 5C.

In the third exemplary embodiment, a furnished package of such a structure also is made to be an object of processing of the driver setting changing processing. Therefore, among all of the device types of the printers 12 that are objects of processing, for the respective device types in which the data that is set as changeable item data and initial value/operation restriction data is not gathered together in the furnished package, the tree structure at the time of displaying the names and default initial values of all of the changeable items, the selection choices of the initial values, the default settings relating to user operation restriction, the selection choices of settings relating to user operation restriction, and the changeable items, is investigated in advance. The results of investigation are gathered together as changeable item data and initial value/operation restriction data. The gathered changeable item data and initial value/operation restriction data are registered in advance in the changeable item database (DB) in correspondence with device type identifying data that identifies the corresponding device type.

Figure 8:
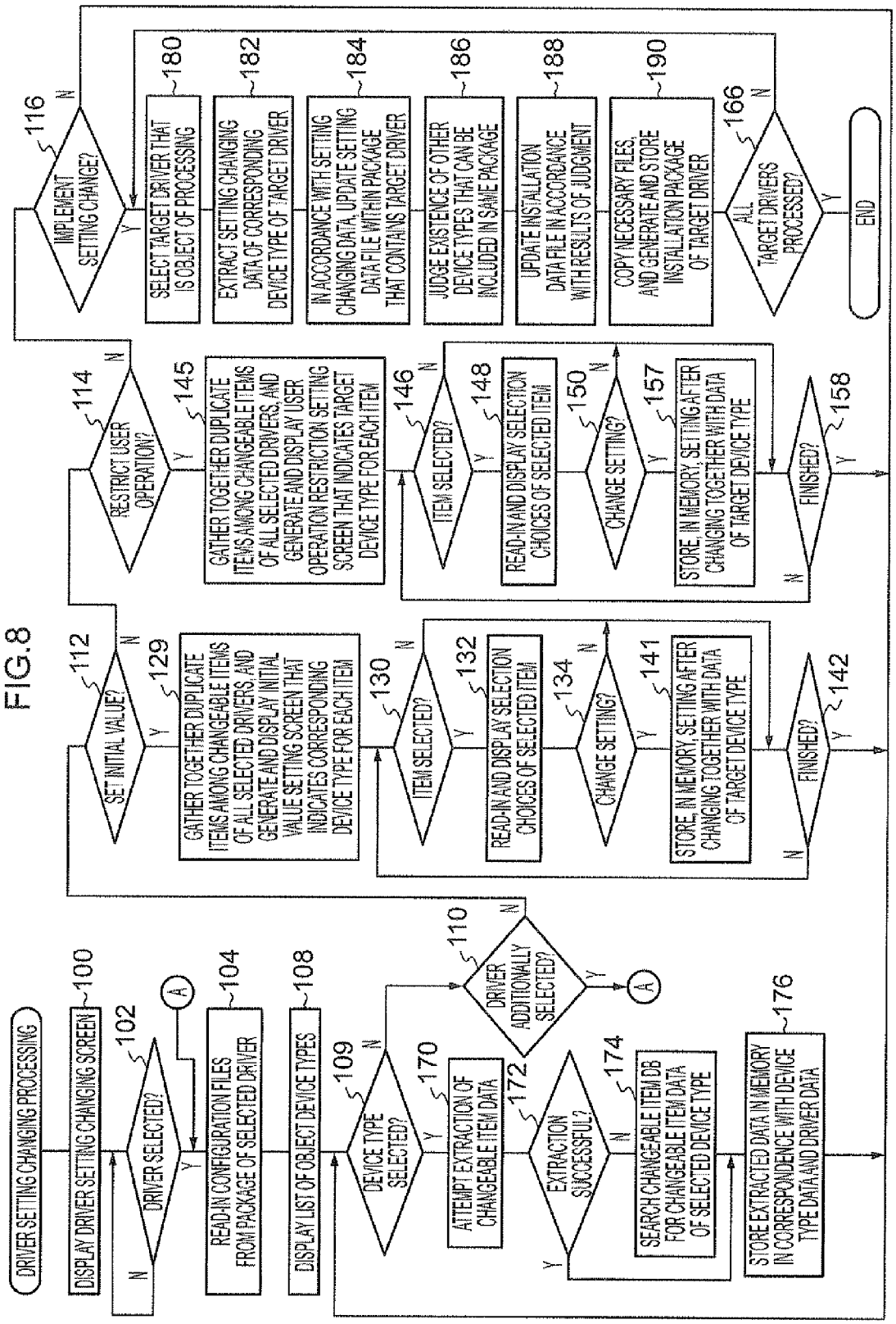
FIG. 8 is a flowchart showing the contents of driver setting changing processing relating to the third exemplary embodiment.

Only the portions of the driver setting changing processing relating to the third exemplary embodiment, which portions differ from the driver setting changing processing (FIG. 3), described in the first exemplary embodiment, are described next with reference to FIG. 8 as the operation of the third exemplary embodiment.

Figure 9A:
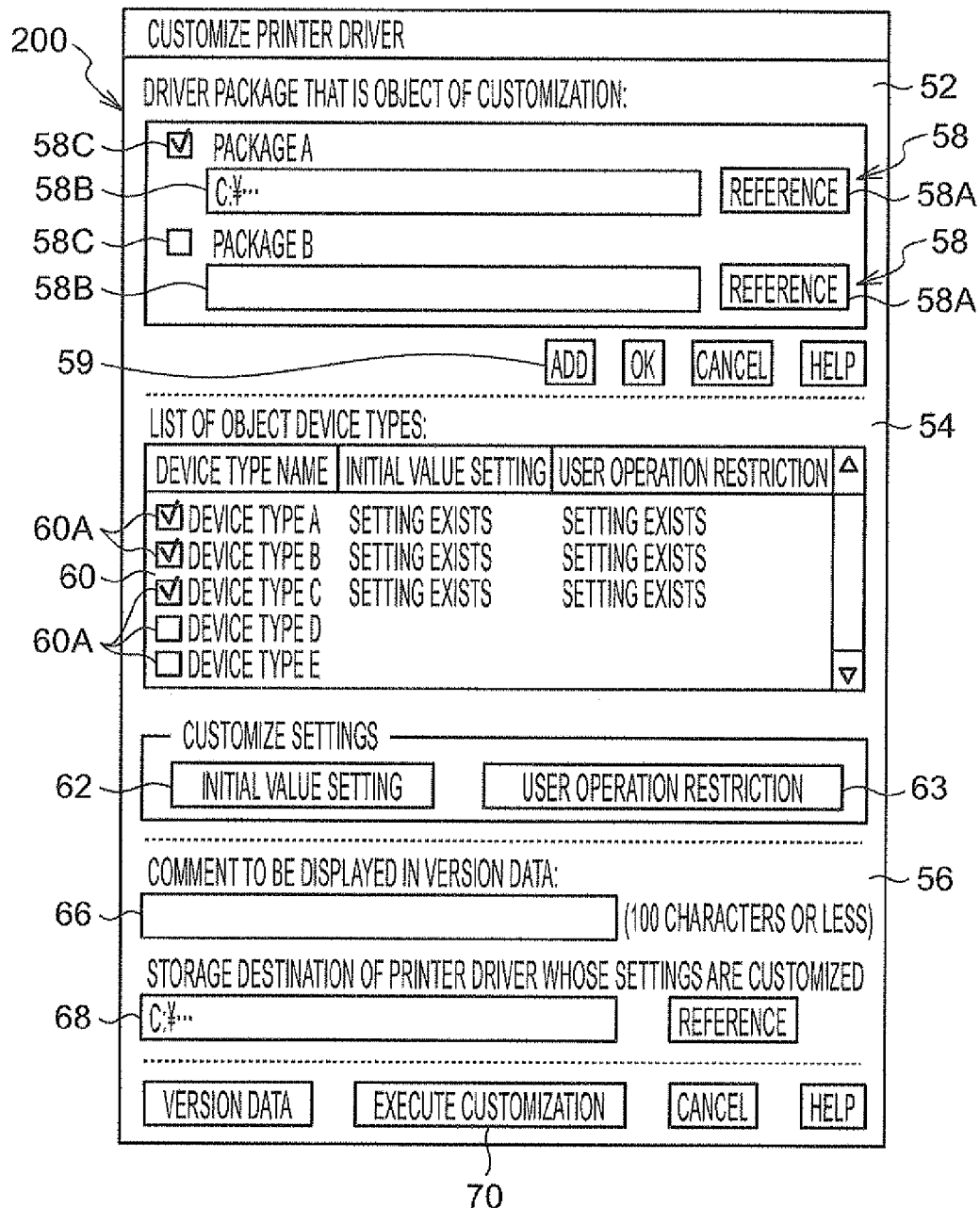
FIG. 9A is an image drawing showing an example of a driver setting changing screen relating to the third exemplary embodiment.

In the driver setting changing processing relating to the third exemplary embodiment, first, in step 100, a driver setting changing screen 200 shown as an example in FIG. 9A is displayed on the display 34 of the terminal device 30M. In next step 102, it is judged whether or not the furnished package that contains the target printer driver has been selected via the driver setting changing screen 200 displayed on the display 34 in step 100. The driver setting changing screen 200 shown in FIG. 9A is a screen that is structured such that batch changing of the settings for plural, arbitrary printer drivers including printer drivers of printers 12 whose specifications or existence of functions greatly differ, also can be carried out. In the same way as the driver setting changing screen 50 (FIG. 4A) described in the first exemplary embodiment, the driver setting changing screen 200 includes the furnished package selection area 52, the device type selection area 54, and the attribute data setting area 56.

The furnished package selection area 52 of the driver setting changing screen 200 is an area for causing the manager to designate and select one or more target furnished packages. In the same way as the furnished package selection area 52 of the driver setting changing screen 50, the plural unit selection areas 58, that are formed from the button 58A, the display box 58B and the select box 58C, are provided, and further, a button 59 for additionally displaying the unit selection area 58 is provided. Further, the device type display box 60 and the buttons 62, 63 are respectively provided in the device type selection area 54 of the driver setting changing screen 200, in the same way as in the device type selection area 54 of the driver setting changing screen 50.

The above-described first and second exemplary embodiments are premised on the fact that a furnished package, that contains respective printer drivers (plural types of printer drivers whose changeable items are the same or are substantially common) of the printers 12 of plural device types that are similar (plural types of printers 12 at which the specifications are substantially the same and only the existence of minute functions or the processing speed are different), is selected as a target furnished package. However, other than that described above, a furnished package, that contains respective printer drivers of the printers 12 whose specifications and existence of functions greatly differ (i.e., plural types of printer drivers whose changeable items are different), also exists.

Therefore, the driver setting changing screen 200 relating to the third exemplary embodiment assumes that a furnished package, that contains respective printer drivers of the printers 12 whose specifications and existence of functions greatly differ, may be selected as a target furnished package. Select boxes 60A that are for selecting, in units of the device type of the printer 12, the target printer drivers are provided in the device type display box 60 of the device type selection area 54 for the respective individual device types of the printers 12 that are displayed in a list in the device type display box 60. Further, the select box 64, that is provided in the attribute data setting area 56 in the driver setting changing screen 50, is omitted in the driver setting changing screen 200.

When the driver setting changing screen 200 having the above-described screen structure is displayed, in the same way as in the first exemplary embodiment, the manager carries out the series of operations of first selecting the button 58A within the furnished package selection area 52, and next, designating the storage destination of the furnished package that contains the target printer driver, and selecting, via the corresponding selection box 58C, the target printer driver contained in the target furnished package. Accompanying the execution of these operations, the judgment in step 102 is affirmative, and the routine move on to step 104. In step 104, the data files (the installation data file, the UI data files, and the setting data file group), among the configuration files of the furnished package of the target printer driver, are read-out from the storage 32C to the memory 32B.

In next step 108, the corresponding device type identifying data, that expresses all of the device types (all of the models) of the printers 12 that the printer drivers contained in the furnished package correspond to, is extracted from the data that was read-out in step 104 from the target furnished package. On the basis of the extracted corresponding device type identifying data, the names of all of the device types (all of the models) of the printers 12, that the printer drivers contained in the target furnished package correspond to, are displayed in a list with the select boxes 60A respectively being added thereto within the device type display box 60 of the device type selection area 54.

In next step 109, it is judged whether or not the target device type of the printer 12 (to which corresponds the printer driver) has been selected from among the respective device types of the printers 12 whose names are displayed in a list in the device type display box 60 of the device type selection area 54. If the judgment is negative, the routine moves on to step 110. In step 110, in the same way as in the driver setting changing processing (FIG. 3) described in the first exemplary embodiment, it is judged whether or not an operation that adds, as an object of setting changing, (a new furnished packaged that contains) a target printer driver has been carried out. If the judgment is negative, in step 112, it is judged whether or not changing of initial values of the changeable items of the printer driver has been instructed due to the button 62 being selected. If this judgment also is negative, in step 114, it is judged whether or not changing of settings of restrictions relating to user operation has been instructed for the changeable items of the printer driver due to the button 64 being selected. If this judgment as well is negative, in step 116, it is judged whether or not execution of changing of settings with respect to the printer driver has been instructed due to the button 70 provided beneath the attribute data setting area 56 being selected. If this judgment also is negative, the routine returns to step 110, and step 109 through step 116 are repeated until any of the judgments is affirmative.

In the third exemplary embodiment, when the names of all of the device types of the printers 12, to which correspond the printer drivers that are contained in the target furnished package, are displayed in a list within the device type display box 60, the manager may select the target device type from among the displayed device types. Due thereto, the judgment in step 109 is affirmative, and the routine moves on to step 170. In step 170, with respect to the setting data file group that is included in the data files that were read-out from the target furnished package in above step 104, extraction of changeable item data from this setting data file group is attempted. In next step 172, it is judged whether or not extraction of the changeable item data was successful.

If changeable item data is extracted from the setting data file group, it can be judged that the selected furnished package is a structure that is premised on setting changing being carried out by the driver setting changing processing. Namely, it can be judged that the selected furnished package is a structure in which data, such as the names of the changeable items of the printer driver, are gathered together as changeable item data, and in which the initial values of the respective changeable items and the settings relating to user operation restriction are gathered together as initial value/operation restriction data. Therefore, the routine moves on to step 176, and the changeable item data and the initial value/operation restriction data are extracted from the setting data file group. The respective data that are extracted are stored in the memory 32B in correspondence with device type identifying data that identifies the device type of the corresponding printer 12 and the attribute data of the printer driver (e.g., data identifying the furnished package in which the printer driver is contained, or the like). Thereafter, the routine returns to step 109.

On the other hand, if changeable item data is not extracted from the setting data file group, it can be judged that the selected furnished package is a structure that is not premised on setting changing being carried out by the driver setting changing processing. Namely, it can be judged that the selected furnished package is a structure in which data, such as the names and initial values of the changeable items of the printer driver, and the settings relating to user operation restriction, are set to as to be dispersed within the setting data file group. Therefore, the routine moves on to step 174, and, by using the device type identifying data as a key, the changeable item data and the initial value/operation restriction data corresponding to the selected device type are searched for in and extracted from the changeable item DB that is stored in the storage 32C. In next step 176, the changeable item data and the initial value/operation restriction data, that were extracted from the changeable item DB by the search of step 174, are stored in the memory 32B in correspondence with the device type identifying data that identifies the device type of the corresponding printer 12 and attribute data of the printer driver. Thereafter, the routine returns to step 109. Due thereto, each time a target device type is selected by the manager, the changeable item data and the initial value/operation restriction data of the printer driver corresponding to the selected device type are stored in the memory 32B.

Further, when it is desired to also include, in the objects of setting changing, a printer driver that is contained in a furnished package that is different from the target furnished package that was initially selected, the manager may select a new target furnished package, via the furnished package selection area 52. When this operation is carried out, the judgment in step 110 is affirmative, and the routine returns to step 104. The processings of steps 104 and 108 are carried out on the target furnished package that is additionally selected.

Figure 9B:
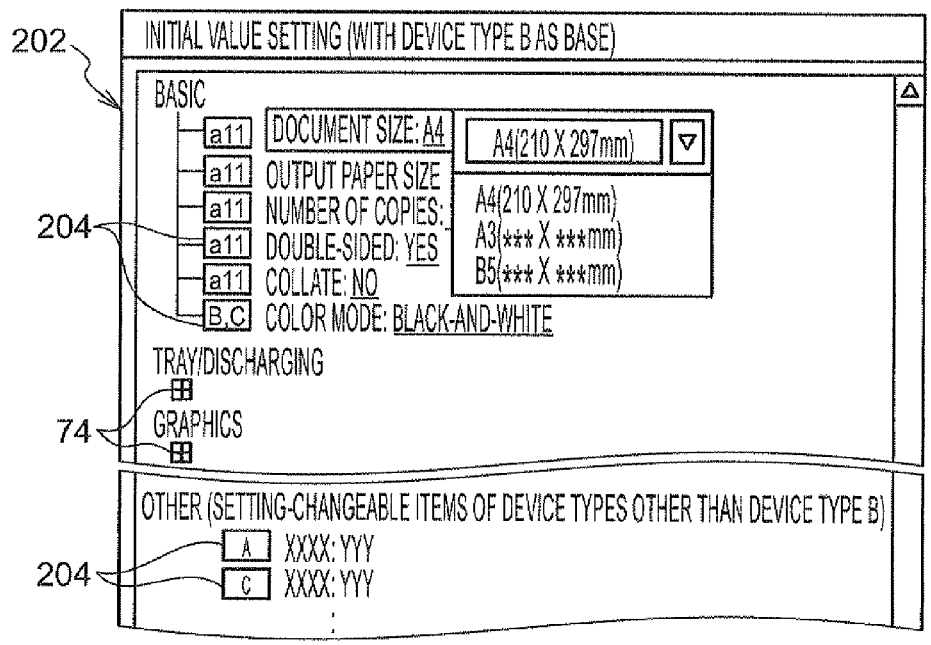
FIG. 9B is an image drawing showing an example of an initial value setting screen relating to the third exemplary embodiment.

When the manager selects the button 62 within the device type selection area 54 in order to change the initial value of any of the changeable item of the selected printer driver, the judgment in step 112 is affirmative, and the routine moves on to step 129. In step 129, on the basis of the changeable item data and the initial value/operation restriction data stored in the memory 328 for each target device type, an initial value setting screen 202 shown in FIG. 9B is generated, and the generated initial value setting screen 202 is displayed on the display 34 of the terminal device 30M. In the third exemplary embodiment, printer drivers of the printers 12 whose specifications or existence of functions differ greatly can respectively be selected as objects of setting changing. Accordingly, there is the possibility that the changeable items of the printer drivers, that correspond to the individual target device types will differ greatly.

Therefore, in step 129, first, the names of all of the changeable items are respectively extracted per printer driver corresponding to the individual device types, from the changeable item data for each target device type. Processing that gathers together the repeat items (the items that are changeable items also at a printer driver corresponding to another device type) among the extracted changeable items is carried out. Further, a device type that is to be the reference in the display of the changeable items on the initial value setting screen 202 is selected from among the respective target device types. The changeable items, that have undergone the processing of gathering repeat items together, are grouped into an item group, that is included in the changeable items of the printer driver of the selected specific device type, and an item group, that is not included in the changeable items of the printer driver of the specific device type. Then, as shown in FIG. 9B, the item group that is included in the changeable items of the printer driver of the specific device type is displayed, in a tree structure and per type, on the basis of data for displaying in a tree structure the changeable items included in the changeable items of the specific device type. The item group that is not included in the changeable items of the printer driver of the specific device type is displayed therebeneath in order. Further, a screen in which marks 204, that indicate which of the device types the corresponding item is a changeable item of, are added to the individual changeable items, is generated and displayed.

Among the individual marks 204 shown in FIG. 9B, the marks 204 stating "all" express that the corresponding changeable item is a changeable item in all of device types A, B, C of the printer 12 selected within the device type display box 60. The mark 204 stating "B, C" expresses that the corresponding changeable item is a changeable item in the device types B, C of the printer 12. The mark 204 stating "A" expresses that the corresponding changeable item is a setting-changeable item in only the device type A of the printer 12. The mark 204 stating "C" expresses that the corresponding changeable item is a changeable item in only the device type C of the printer 12. The above-described marks 204 indicate which of the device types the corresponding changeable item can be changed at. However, instead, the marks 204 may indicate the device types at which the corresponding changeable item cannot be changed.

For the device type that is the reference in the display of the changeable items, it is desirable to select a device type having a larger number of changeable items that are displayed in a tree structure, in consideration of the ease of viewing the initial value setting screen 202 and the ease of setting. For example, the device type having the maximum number of changeable items, or the device type whose time of development is the newest can be used. Initial values at a device type that is selected in accordance with a preset condition from among the plural device types (e.g., if the device type that is the reference is included among the plural device types, that device type, whereas, if the device type that is the reference is not included, the device type whose time of development is the newest, or the like) may be displayed as the initial values that are displayed in the initial value setting screen 202 for the items that are changeable items at the plural device types. Or, the initial values of plural device types may be compared, and, if they match, the initial values may be displayed, whereas, if they do not match, the initial values may be made to be not displayed.

In next step 130, it is judged whether or not any of the changeable items that are displayed within the initial value setting screen 202 have been selected. If the judgment is negative, the routine moves on to step 142, and it is judged whether or not a button (not shown), that is provided within the initial value setting screen 202 for instructing ending of initial value changing of changeable items, has been selected. If this judgment also is negative, the routine returns to step 130, and steps 130, 142 are repeated until either of the judgments is affirmative.

When the initial value setting screen 202 shown in FIG. 9B is displayed, the manager may select a target changeable item that is an object of initial value changing, among the changeable items that are displayed within the screen 202. When this operation is carried out, the judgment in step 130 is affirmative. The routine moves on to step 132, and it is judged which of the device types, among the respective target device types, the selected target changeable item corresponds to. The selection choices of the initial value of the selected target changeable item are extracted from the initial value/operation restriction data of the judged device type. The extracted selection choices of the initial value are displayed in a list within the initial value setting screen 202 as shown as an example in FIG. 9B. When the selected target changeable item corresponds to plural device types, selection choices of the initial value may be extracted per device type, and the selection choices of the initial value that are common to corresponding, plural device types among the extracted selection choices of the initial value, only may be displayed. Or, similarly to the above-described marks 204, marks that indicate the device types for which a selection choice can be selected may be added to each selection choice of an initial value, and all of the extracted selection choices of the initial value may be displayed.

In next step 134, it is judged whether or not changing of the initial value has been instructed for the target changeable item. When the selection choices of the initial value of the target changeable item are displayed in a list as shown in FIG. 9B within the displayed initial value setting screen 202, the manager may select the desired selection choice among the displayed selection choices. When this operation is carried out, it is judged that changing of an initial value has been instructed, and the judgment in step 134 is thereby affirmative and the routine moves on to step 136. In step 136, the initial value corresponding to the selection choice selected by the manager is stored, as the initial value after changing, in the memory 3213 in correspondence with data expressing the device type of the printer 12 corresponding to the target changeable item. Note that, if none of the selection choices that are displayed in a list are selected by the manager, the judgment in step 134 is negative, and the routine moves on to step 142.

For all of the changeable items for which changing of the initial value is desired, as described above, the manager may select the changeable item, and select the desired selection choice (the initial value after changing) from among the selection choices that are displayed in a list. By repeating step 130 through step 142 each time the above-described operations are carried out, the initial values after changing are respectively stored in the memory 3213 in correspondence with data expressing the device type of the corresponding printer 12, for all of the target changeable items. Then, when the manager carries out the above-described respective operations for all of the target changeable items, the manager may carry out the operation of selecting a button for instructing ending of initial value changing. Due thereto, the judgment in step 142 is affirmative, and the routine returns to step 109.

When the manager selects the button 63 within the device type selection area 54 of the driver setting changing screen 200 in order to change settings relating to user operation restriction for any of the changeable items of a target printer driver, the judgment in step 114 is affirmative, and the routine moves on to step 145. In step 145, on the basis of the changeable item data and the initial value/operation restriction data that are stored in the memory 3213 for each target device type, a user operation restriction setting screen 206 shown in FIG. 9C is generated, and the generated user operation restriction setting screen 206 is displayed on the display 34 of the terminal device 30M.

In step 145 as well, the possibility can be considered that the changeable items of the printer drivers corresponding to the individual target device types may differ greatly. Namely, in the same way as in above-described step 129, among all of the changeable items of the respective target device types, an item group, that is included in the changeable items of a printer driver of a specific device type, is displayed in a tree structure and per type, in accordance with the tree structure display of changeable items by the printer driver of the specific device type. The item group, that is not included in the changeable items of the printer driver of the specific device type, is displayed therebeneath in order. Further, marks 208 that indicate which of the device types the item is a changeable item of, are added to the individual changeable items, is generated and displayed in the screen.

In next step 146, it is judged whether or not any of the changeable items displayed within the user operation restriction setting screen 206 have been selected. If the judgment is negative, the routine moves on to step 158, and it is judged whether or not a button (not shown), that is provided within the user operation restriction setting screen 206 for instructing ending of setting changing relating to user operation restriction of changeable items, has been selected. If this judgment also is negative, the routine returns to step 146, and steps 146, 158 are repeated until either of the judgments is affirmative.

Figure 9C:
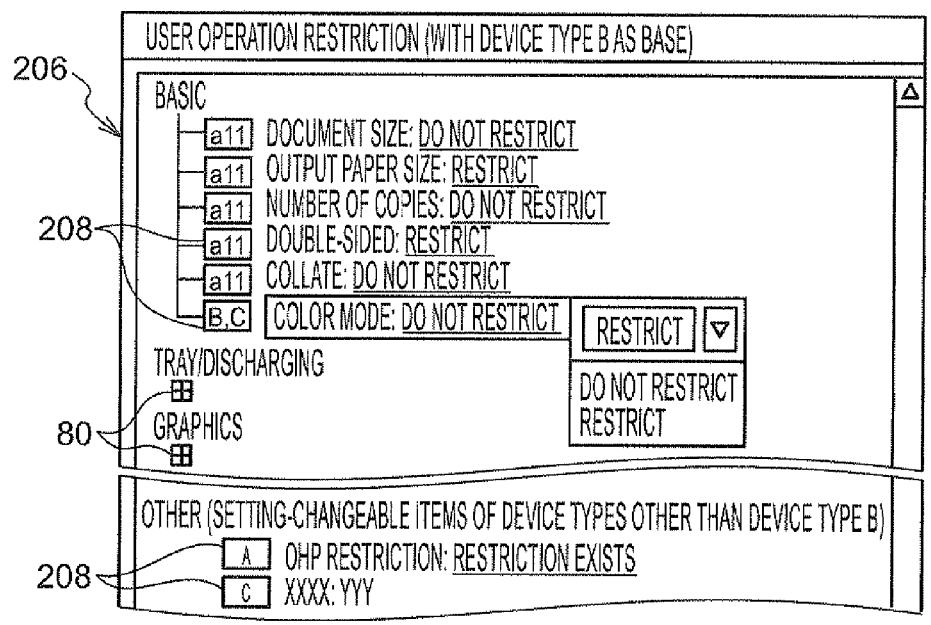
FIG. 9C is an image drawing showing an example of a user operation restriction setting screen relating to the third exemplary embodiment.

When the user operation restriction setting screen 206 shown in FIG. 9C is displayed, the manager may select a target changeable item whose setting is to be changed, from among the changeable items that are displayed. When this operation is carried out, the judgment in step 146 is affirmative, and the routine moves on to step 148. In step 148, it is judged which device type, among the respective target device types, the target changeable item selected by the manager corresponds to. The selection choices of the setting relating to user operation restriction of the selected target changeable item are extracted from the initial value/operation restriction data of the judged device type. The extracted selection choices are displayed in a list within the user operation restriction setting screen 206 as shown as an example in FIG. 9C.

In next step 150, it is judged whether or not a change has been instructed for the changeable item whose setting relating to user operation restriction is to be changed. When the selection choices of the setting for the changeable item are displayed in a list as shown in FIG. 9C within the user operation restriction setting screen 206, the manager may select the desired selection choice from among the displayed selection choices. When this operation is carried out, it is judged that a change in setting relating to user operation restriction has been instructed. The judgment in step 150 is thereby affirmative, and the routine moves on to step 157. In step 157, the set value corresponding to the selection choice selected by the manager is stored, as the set value after changing, in the memory 32B in correspondence with data expressing the device type of the printer 12 corresponding to that changeable item. Note that, if the manager does not select any of the selection choices that are displayed in a list, the judgment in step 150 is negative, and the routine moves on to step 158.

The manager may carry out as described above the respective operations of selecting a changeable item and selecting the desired selection choice (set value) from among the selection choices displayed in a list, for all of the target changeable items. Each time the above-described operations are carried out, step 146 through step 158 are repeated. In this way, the set values after changing are respectively stored in the memory 32B in correspondence with data expressing the device type of the corresponding printer 12, for all of the target changeable items. Then, when the manager carries out the respective above-described operations for all of the target changeable items, the manager may select a button for instructing ending of the setting changing relating to user operation restriction. The judgment in step 158 is thereby affirmative, and the routine returns to step 109.

When the manager changes the respective initial values for all of the target changeable items that are objects of initial value changing, and changes the respective settings for all of the target changeable items for which settings relating to user operation restriction are to be changed, the manager may select the button 70 within the driver setting changing screen 200. Accompanying this, the judgment in step 116 is affirmative, and the routine moves on to step 180. In step 180, the manager may select the printer driver corresponding to the device type that is the object of installation package generation, from among all of the target device types of the printers 12.

In next step 182, the setting changing data corresponding to the device type selected in step 180 is extracted from the setting changing data that was stored in the memory 32B in above step 129 through step 142, step 145 through step 158 (the initial values after changing of the target changeable items that are objects of initial value changing, and the set values after changing of the target changeable items whose settings relating to user operation restriction are changed). In step 184, when the printer driver is to be installed, the setting data file group, that is read-out from the furnished package that contains the printer driver corresponding to the device type selected in step 180 and that is stored in the memory 32B, is updated in accordance with the setting changing data extracted in step 182, so that changing of settings that corresponds to the setting changing data extracted in step 182 is carried out.

If the furnished package that contains the printer driver corresponding to the device type selected in step 180 is a structure in which the changeable item data and the initial value/operation restriction data are added to the setting data file group, updating of the setting data file group such that changing of settings based on the setting changing data is carried out at the time of installing the printer driver, can be realized by, as described in the first exemplary embodiment. That is, updating, in accordance with the setting changing data extracted in step 182, the initial values and the settings relating to user operation restriction that are set in the initial value/operation restriction data that is included in the setting data file group.

On the other hand, if the furnished package that contains the printer driver corresponding to the device type selected in step 180 is a structure in which data such as the names and set values of the changeable items of the printer driver, the settings relating to user operation restriction, and the like are set so as to be dispersed within the setting data file group, the locations of the respective data with the setting data file group are not uniform, and it is difficult to rewrite the respective data within the setting data file group. Therefore, as the processing that updates the setting data file group, a setting change description file is generated in accordance with the setting changing data extracted in step 182, and the generated setting change description file is added to the setting data file group.

The setting change description file is a file for installing a printer driver whose initial values of changeable items and/or settings relating to user operation restriction have been changed. The setting change description file can be generated by describing, in accordance with a predetermined description format that does not depend on the device type, commands that instruct changing of the initial values of the changeable items and/or the settings relating to user operation restriction. By adding the setting change description file to the package of the printer driver that is the object of installation, the setting change description file is referenced by the program that carries out installation of the printer driver, and processings such as interpreting the commands, executing the instructed setting changes are carried out. However, knowledge relating to the description format at is needed in order to generate the setting change description file. Therefore, the generation of the setting change description file is usually carried out by the developer of the printer driver. In the above description, the processing of generating a setting change description file and adding it to the setting data file group is carried out by the terminal device 30M on the basis of the setting change data.

In next step 186, it is judged whether or not, among the respective target device types that are objects of setting change, there is another device type whose printer driver can be contained in the same installation package as the device type that is the object of installation package generation that was selected in step 180. Generally, a furnished package that respectively contains printer drivers of printers 12 of plural device types that are similar (printer drivers whose changeable items are the same or are substantially common) is configured such that a single installation data file is used in common in the installation of the respective printer drivers within the furnished package. When a printer driver of a device type that is an object of installation package generation is contained within a furnished package of the above-described structure, and the corresponding device type of another printer driver that is contained within the same furnished package is also selected as a target printer driver, it is judged that there is a printer driver of another device type that can be contained in the same installation package.

Generally, a furnished package, that respectively contains printer drivers of the printers 12 whose specifications or existence of functions greatly differ, is a structure in which the installation data files also are provided per printer driver within the furnished package. If the printer driver of the device type that is the object of installation package generation is contained in a furnished package of the above-described structure, it is judged that there are no printer drivers of other device types that can be contained in the same installation package.

In next step 188, the installation data file, that corresponds to the printer driver of the device type that is the object of installation package generation, is updated in accordance with the results of the judgment in step 186. In the installation data file, description is given of the corresponding device types of all of the printer drivers that are contained in the furnished package. Therefore, if it is judged that there is a printer driver of another device type that can be contained in the same installation package, updating is carried out such as, among the descriptions of the respective device types in that file, deleting the descriptions relating to device types other than the target device types, or changing the names of the files, that are objects of installation described in the installation data file, to names that differ per target device type, and the like. When it is judged that there is no printer driver of another device type that can be contained in the same installation package, if there is description relating to another device type in that file, the description is deleted. If a setting change description file is added to the setting data file group in above step 184, processing such as adding description that makes the added setting change description file be an object of installation, or the like is carried out.

In next step 190, the program file group that is needed in installing the printer driver of the device type that is the object of installation package generation, is read-out to the memory 32B from the furnished package that contains the printer driver of the device type that is the object of installation package generation that was selected in step 180. The UI data files and the setting data file group that was updated in step 184 are added to the read-out program file group. If there are plural device types that are objects of installation package generation, this file group is copied so as to become the same number as the number of device types that are objects of installation package generation. Further, after different names (the names described in the installation data file) are given to the respective device types, the installation data file that was updated in step 188 is further added, and the installation package for the printer driver is thereby generated. Then, the generated installation package is stored in the storage 32C.

In next step 166, it is judged whether or not installation package generation has been carried out for the printer drivers of all of the target device types. If the judgment is negative, the routine returns to step 180, and step 180 through step 190, and step 166, are repeated. Due thereto, the installation package generation is respectively carried out for the printer drivers of all of the target device types. When the judgment in step 166 is affirmative, the driver setting changing processing ends.

Note that, in the above-described driver setting changing processing, steps 100, 129, 145 may correspond to the functions of a display controlling section, and step 129 through step 142, step 145 through step 158, step 180 through step 190, and step 166 may correspond to the functions of a changing section.

The third exemplary embodiment describes an example in which all of the items that are made to be changeable items at least one target device type, are displayed in the initial value setting screen 202 or the user operation restriction setting screen 206 as items that can be changed. However, embodiments are not limited to the same. It is possible to display, as the items whose initial values can be changed and whose settings relating to user operation can be changed, only items that are changeable items at all of the target device types. As shown in FIG. 9B and FIG. 9C, the corresponding device type can be recognized by the manager by displaying the marks 204, 208 also in the initial value setting screen 202 and the user operation restriction setting screen 206 that display all of the items that are changeable items at least one target device type. However, in a case of displaying only the items that are changeable items at all of the target device types, when carrying out a setting change that must be applied to all of the printers 12 within the computer system in particular, the manager may reliably recognize whether or not the setting change of the corresponding item can be applied to all of the printers 12.

Further, in the above description, changing of the initial value of a changeable item (an example of a first designation), and changing of a setting relating to user operation restriction of a changeable item (an example of a second designation), are described as examples of changing of settings of a printer driver that a manager can designate. However, embodiments are not limited to the same. The system may be configured such that changing (an example of a third designation) of the setting (displayed/not displayed) relating to the displaying of the changeable items on the setting/printing instruction screen that is displayed by the printer driver, also is possible. Prohibiting use of some functions among the various types of functions that the printer 12 provides also can be realized by, for specific changeable items that correspond to the some functions, setting values that express that the some functions are not to be used as the initial value thereof, and carrying out setting to exclude the some functions from objects of display on the setting/printing instruction screen.

The above describes an aspect in which the driver setting changing processing is carried out at the terminal device 30M that the manager operates, and the terminal device 30M functions as an example of a setting changing device relating to the present invention. However, embodiments are not limited to the same. The print server 20 or the file server 94 may be made to function as an example of the setting changing device, by causing the driver setting changing processing to be executed on the print server 20 or the file server 94.

Further, the above describes embodiments in which the setting changes that the manager designates are applied at the time of installing the printer driver, by generating an installation package for installing the printer driver to which the setting changes designated by the manager are applied, before installation of the printer driver is carried out. However, the timing of applying the setting changes is not limited to the time of installing the device driver. For example, a structure is possible in which, when an installed device driver displays a setting screen, data, that prescribes items displayed in the setting screen and the initial values thereof and whether or not the displayed items are to be made to be changeable, is referenced, and a setting screen is generated and displayed in accordance with the data that is referenced. In this case, by carrying out processing such as rewriting the data or the like, the present exemplary embodiment can also be applied to the batch changing of settings of installed device drivers.

Further, although a printer driver is described as an example of the device driver in the above description, embodiments are not limited to the same. The embodiments can also be applied to the changing of settings for the driver of a device other than a printer, e.g., a device such as a scanner or the like.

Embodiments are described above in which the driver setting changing program is stored (installed) in advance in the terminal device 30M. However, the driver setting changing program may be provided in a form of being recorded on a recording medium such as a CD-ROM, a DVD-ROM, or the like.

What is claimed is:
1. A setting changing device comprising:
a display controlling section that displays a designation screen for carrying out, with respect to at least one device driver among a plurality of target device drivers that are stored in a storage section, the plurality of target device drivers including a first device driver and a second device driver of a different type than the first device driver, at least one of a first designation that designates, from among changeable items that can be changed via a setting screen that is displayed by the at least one target device driver, a first item that is an object of initial value changing and an initial value of the first item; a second designation that designates, from among the changeable items, a second item that prohibits changing via the setting screen by a user other than a manager; or a third designation that designates, from among the changeable items, a third item that prohibits displaying on the setting screen for users other than a manager;

a receiving section that receives the at least one of the first designation, the second designation or the third designation; and a changing section that, on the basis of the at least one of the received first designation, second designation and third designation, applies a uniform change to the plurality of target device drivers by (a) changing respective settings of the plurality of target device drivers, or, (b) for each of the plurality of target device drivers, generating or changing for each of the changeable items, setting data that is referenced by device drivers when the setting screen is displayed, and that prescribes an initial value of the changeable item and at least one of existence of prohibiting of changing of the changeable item via the setting screen or existence of display of the changeable item on the setting screen.

2. The setting changing device of claim 1, wherein the designation screen displays the individual changeable items in a list together with at least one of a current initial value, existence of prohibiting of changing by a user other than a manager, or existence of prohibiting of display for a user other than a manager, and, when any of the items that are displayed in the list is selected, displays, for the selected item, selection choices that can be set for at least one of the initial value, the existence of prohibiting of changing, or the existence of the prohibiting of display.

3. The setting changing device of claim 1, wherein the designation screen is noted in the same language as words within the setting screen that is displayed by a specific device driver that is selected in accordance with preset selection standards from among the plurality of target device drivers, or, the designation screen is noted in a preset language, on the basis of word notation data for noting words within the designation screen in the preset language which word notation data is added to at least any of the device drivers among the plurality of target device drivers.

4. The setting changing device of claim 1, wherein the display controlling section displays the plurality of device drivers in a list, and makes a plurality of device drivers, that are selected from among the displayed plurality of device drivers, to be the plurality of target device drivers.

5. The setting changing device of claim 4, further comprising:

a judging section that, when only device drivers whose changeable items match are made to be the plurality of target device drivers, judges whether or not changeable items match at the plurality of target device drivers that are selected from among the displayed plurality of device drivers, wherein the display control section displays the plurality of device drivers in a list, and makes, among the plurality of device drivers that are selected from among the displayed device drivers, the device drivers at which it is judged that the changeable items match, to be the plurality of target device drivers.

6. The setting changing device of claim 1, wherein, among the plurality of target device drivers, for a target device driver to which is added changeable item data that expresses changeable items via the setting screen, the changeable items are judged by referencing the changeable item data added to the target device driver, and, for a target device driver to which the changeable item data is not added, the changeable items are judged by reading-out the changeable item data corresponding to the target device driver from a storage that respectively stores the changeable item data for individual target device drivers.

7. The setting changing device of claim 1, wherein, when the changeable items at at least one target device driver differ from the changeable items at other target device drivers, the designation screen includes a screen for carrying out at least one of the first designation, the second designation, or the third designation, for all of the changeable items at the at least one target device driver.

8. The setting changing device of claim 7, wherein the designation screen indicates, for a specific item that cannot be changed at at least one target device driver among respective items for which at least one of the first designation, the second designation, or the third designation can be carried out via the designation screen, a device driver at which the specific item can be changed or a device driver at which the specific item cannot be changed, among the plurality of target device drivers.

9. The setting changing device of claim 1, wherein, when the changeable items at at least one target device driver differ from the changeable items at other target device drivers, the designation screen includes a screen for carrying out at least one of the first designation, the second designation, or the third designation, only for respective items that can be changed at all of the target device drivers.

10. A computer-readable storage medium that stores a program for causing a computer to execute a setting changing processing, the setting changing processing comprising:

displaying a designation screen for carrying out, with respect to at least one device driver among a plurality of target device drivers that are stored in a storage section, the plurality of target device drivers including a first device driver and a second device driver of a different type than the first device driver, at least one of a first designation that designates, from among changeable items that can be changed via a setting screen that is displayed by the at least one target device driver, a first item that is an object of initial value changing and an initial value of the first item; a second designation that designates, from among the changeable items, a second item that prohibits setting changing via the setting screen by a user other than a manager; or a third designation that designates, from among the changeable items, a third item that prohibits displaying on the setting screen for users other than a manager;

receiving the at least one of the first designation, the second designation or the third designation; and on the basis of the at least one of the first designation, second designation or third designation, applying a uniform change to the plurality of target device drivers by (a) changing respective settings of the plurality of target device drivers, or, (b) for each of the plurality of target device drivers, generating or changing for each of the changeable items, setting data that is referenced by device drivers when the setting screen is displayed, and that prescribes an initial value of the changeable item and at least one of existence of prohibiting of changing of the changeable item via the setting screen or existence of display of the changeable item on the setting screen.

11. A method of operating a setting changing device, the method comprising:
displaying a designation screen for carrying out, with respect to at least one device driver among a plurality of target device drivers that are stored in a storage section, the plurality of target device drivers including a first device driver and a second device driver of a different type than the first device driver, at least one of a first designation that designates, from among changeable items that can be changed via a setting screen that is displayed by the at least one target device driver, a first item that is an object of initial value changing and an initial value of the first item; a second designation that designates, from among the changeable items, a second item that prohibits setting changing via the setting screen by a user other than a manager; or a third designation that designates, from among the changeable items, a third item that prohibits displaying on the setting screen for users other than a manager;
receiving the at least one of the first designation, the second designation or the third designation; and
on the basis of the at least one of the first designation, second designation or third designation, applying a uniform change to the plurality of target device drivers by (a) changing respective settings of the plurality of target device drivers, or, (b) for each of the plurality of target device drivers, generating or changing for each of the changeable items, setting data that is referenced by device drivers when the setting screen is displayed, and that prescribes an initial value of the changeable item and at least one of existence of prohibiting of changing of the changeable item via the setting screen or existence of display of the changeable item on the setting screen.

12. The setting changing device of claim 1, wherein the first device driver corresponds to a first operating system, and the second device driver corresponds to a second operating system that is a different type than the first operating system.

13. The setting changing device of claim 12, wherein the first operating system is 32-bit Windows system, and the second operating system is 64-bit Windows system.

14. The setting changing device of claim 1, further comprising a judgment section that judges whether the at least one device driver and the other drivers of the plurality of target device drivers are matched,
wherein the changing section applies the uniform change to the plurality of target device drivers on the basis of the result of the judgment section.

15. The computer-readable storage medium of claim 10, wherein the first device driver corresponds to a first operating system, and the second device driver corresponds to a second operating system that is a different type than the first operating system.

16. The computer-readable storage medium of claim 15, wherein the first operating system is 32-bit Windows system, and the second operating system is 64-bit Windows system.

17. The computer-readable storage medium of claim 10, further comprising the setting changing processing of judging whether the at least one device driver and the other drivers of the plurality of target device drivers are matched,
wherein the applying of the uniform change to the plurality of target device drivers is performed on the basis of the result of the judging.

18. The method of operating a setting changing device of claim 11, wherein the first device driver corresponds to a first operating system, and the second device driver corresponds to a second operating system that is a different type than the first operating system.

19. The method of operating a setting changing device of claim 18, wherein the first operating system is 32-bit Windows system, and the second operating system is 64-bit Windows system.

20. The method of operating a setting changing device of claim 11, further comprising judging whether the at least one device driver and the other drivers of the plurality of target device drivers are matched,
wherein the applying of the uniform change to the plurality of target device drivers is performed on the basis of the result of the judging.

* * * * *